US012007533B2

(12) United States Patent
Xiao et al.

(10) Patent No.: US 12,007,533 B2
(45) Date of Patent: Jun. 11, 2024

(54) OPTICAL IMAGING LENS ASSEMBLY INCLUDING SEVEN LENSES OF +−++−+−, ++−+−+−, +−−+−+−, +−+−++− OR +−++++− REFRACTIVE POWERS

(71) Applicant: Zhejiang Sunny Optical Co., Ltd, Ningbo (CN)

(72) Inventors: Haidong Xiao, Ningbo (CN); Kaiyuan Zhang, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 564 days.

(21) Appl. No.: 17/038,552

(22) Filed: Sep. 30, 2020

(65) Prior Publication Data

US 2021/0132341 A1 May 6, 2021

(30) Foreign Application Priority Data

Nov. 5, 2019 (CN) ........................ 201911069552.7

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | | |
|---|---|---|---|---|
| 2018/0188483 | A1* | 7/2018 | Hsieh | G02B 9/64 |
| 2019/0004285 | A1* | 1/2019 | Tang | G02B 9/64 |
| 2021/0063696 | A1* | 3/2021 | Kamada | G02B 9/64 |
| 2022/0159154 | A1* | 5/2022 | Zhang | H04N 23/51 |
| 2022/0413264 | A1* | 12/2022 | Kim | G02B 13/0045 |

* cited by examiner

*Primary Examiner* — Wen Huang
(74) *Attorney, Agent, or Firm* — Sughrue Mion, PLLC

(57) ABSTRACT

The present disclosure discloses an optical imaging lens assembly including a first lens having positive refractive power with a convex object-side surface and a concave image-side surface; a second lens having refractive power; a third lens having refractive power with a concave image-side surface; a fourth lens having positive refractive power; a fifth lens having refractive power with a convex object-side surface and a concave image-side surface; a sixth lens having positive refractive power with a convex object-side surface and a convex image-side surface; and a seventh lens having negative refractive power with a concave object-side surface and a concave image-side surface. A distance TTL along the optical axis from the object-side surface of the first lens to an imaging plane, half a diagonal length ImgH of an effective pixel area on the imaging plane and a total effective focal length f satisfy: 5.00 mm<TTL/ImgH*f<6.00 mm.

14 Claims, 12 Drawing Sheets

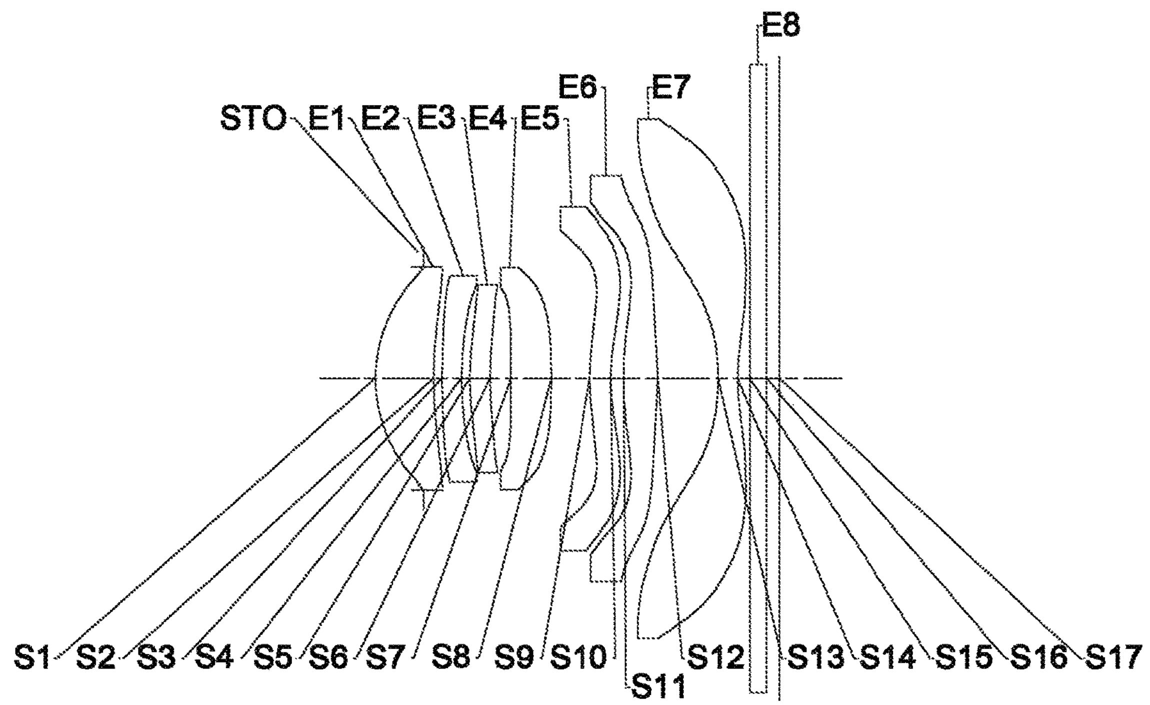
Fig. 1
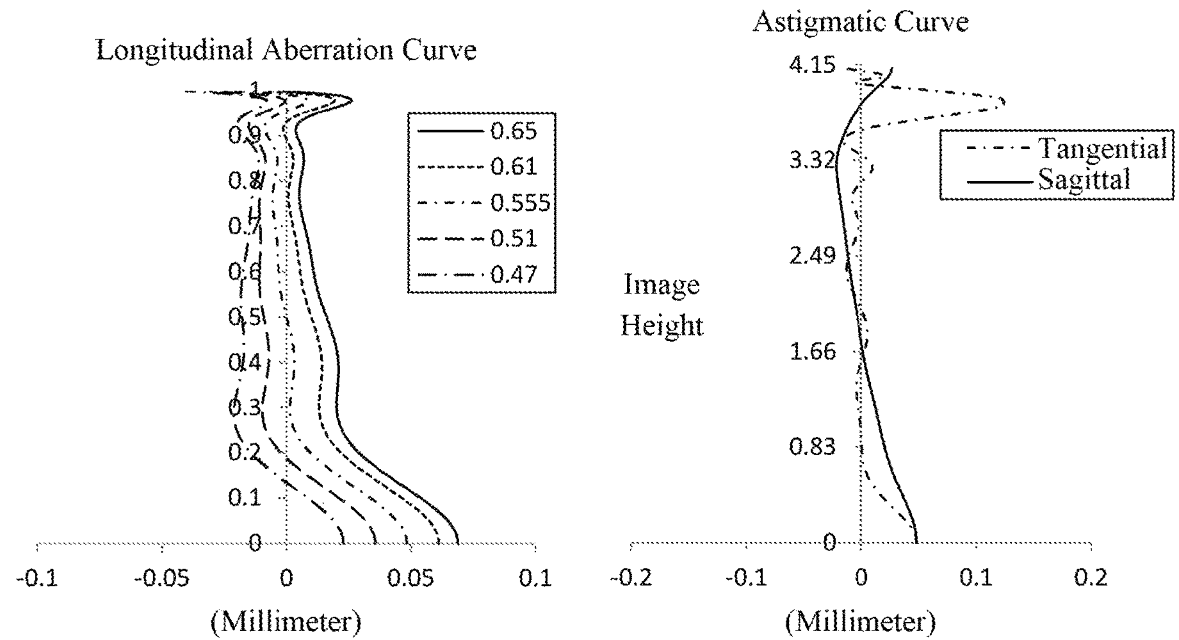
Fig. 2A
Fig. 2B

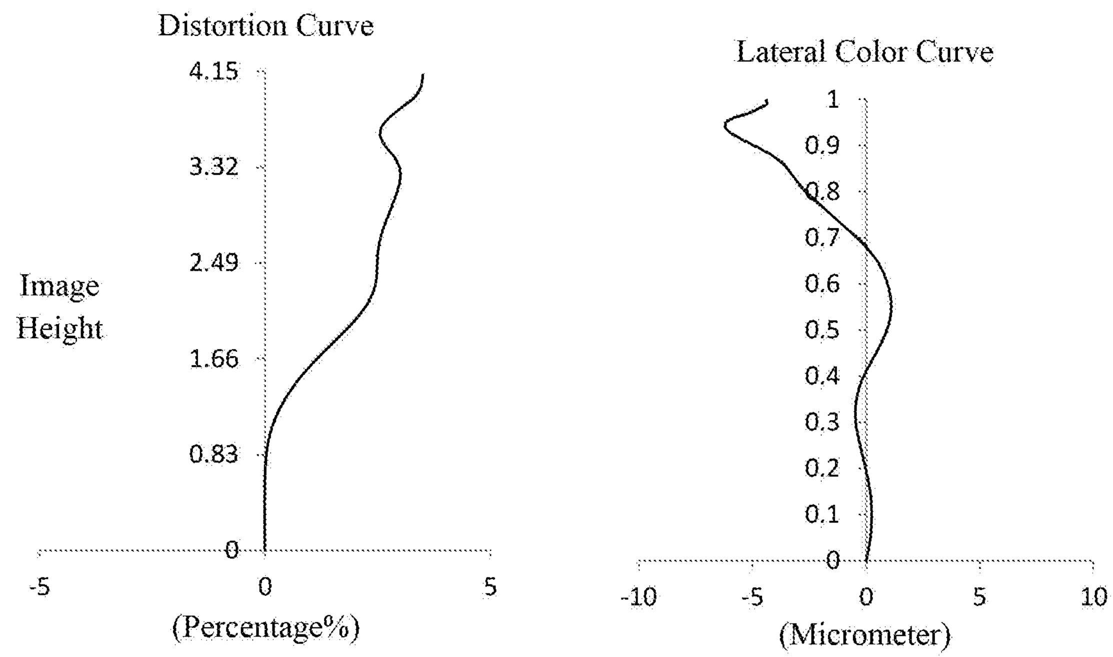
Fig. 2C
Fig. 2D
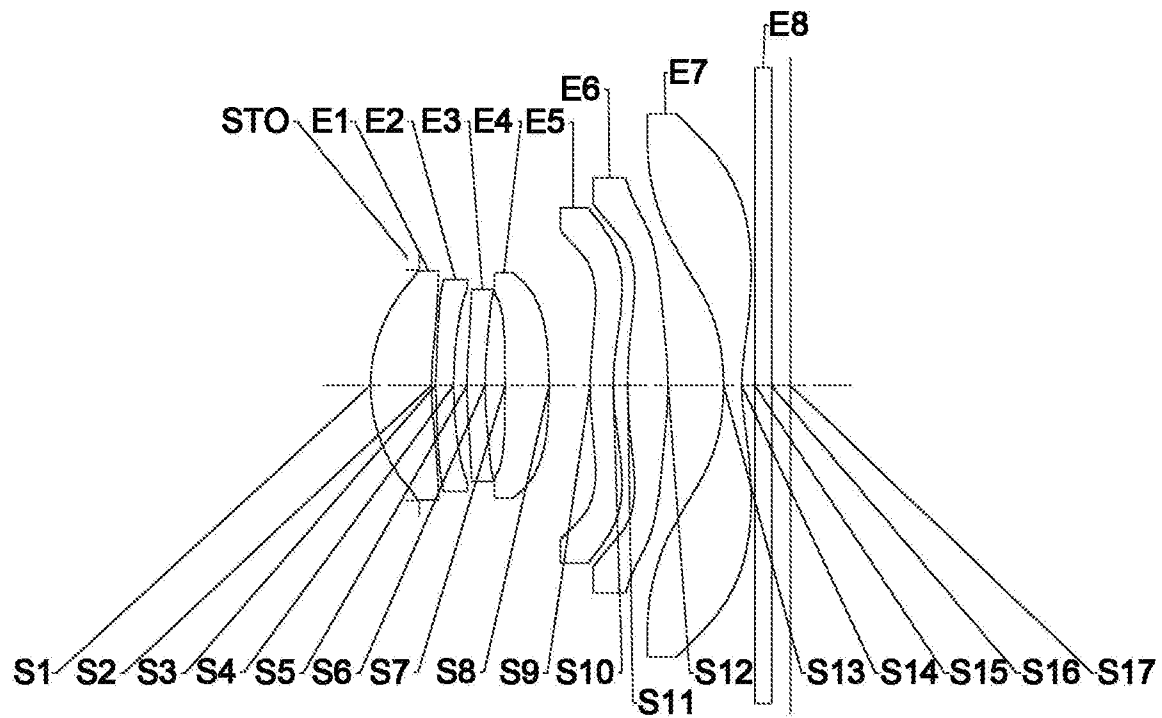
Fig. 3

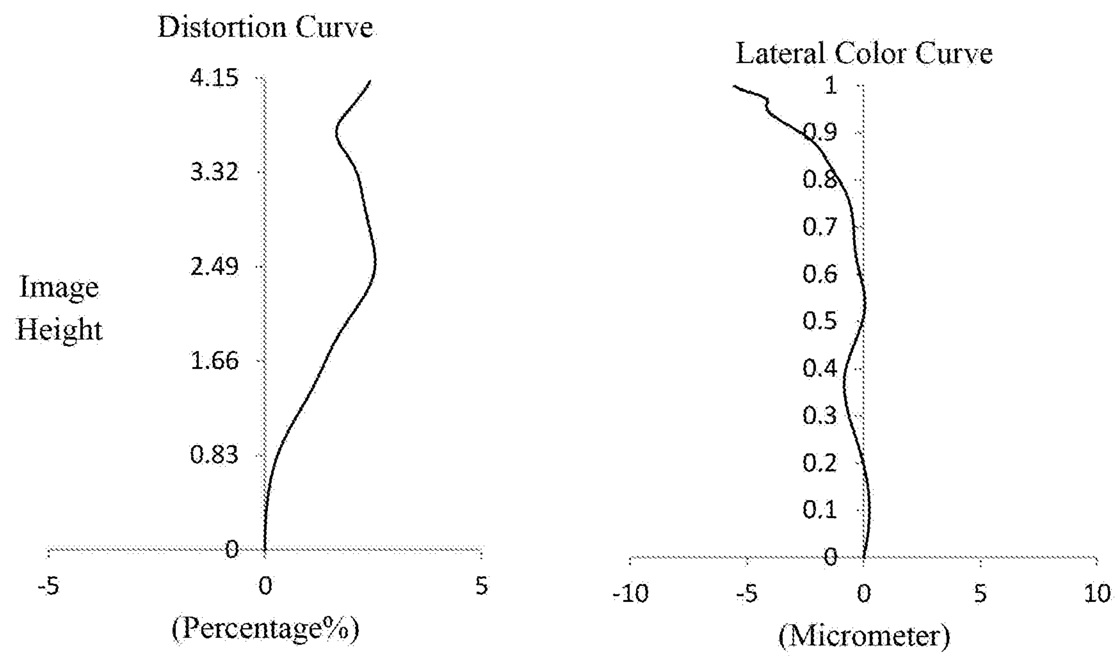
Fig. 6C
Fig. 6D
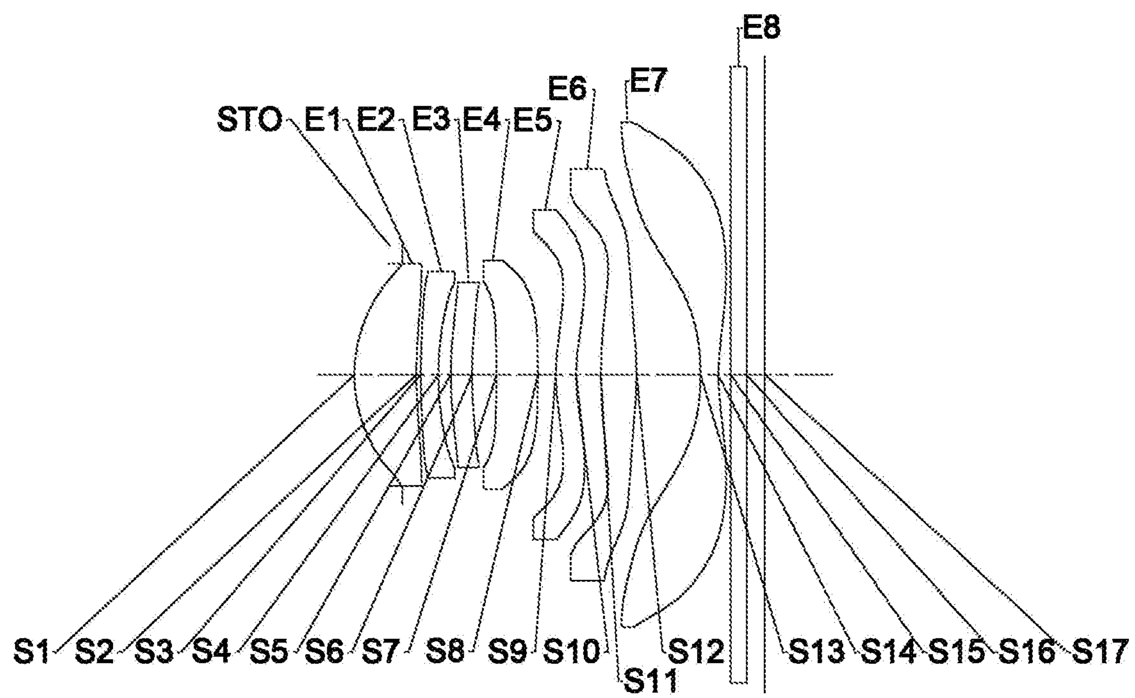
Fig. 7

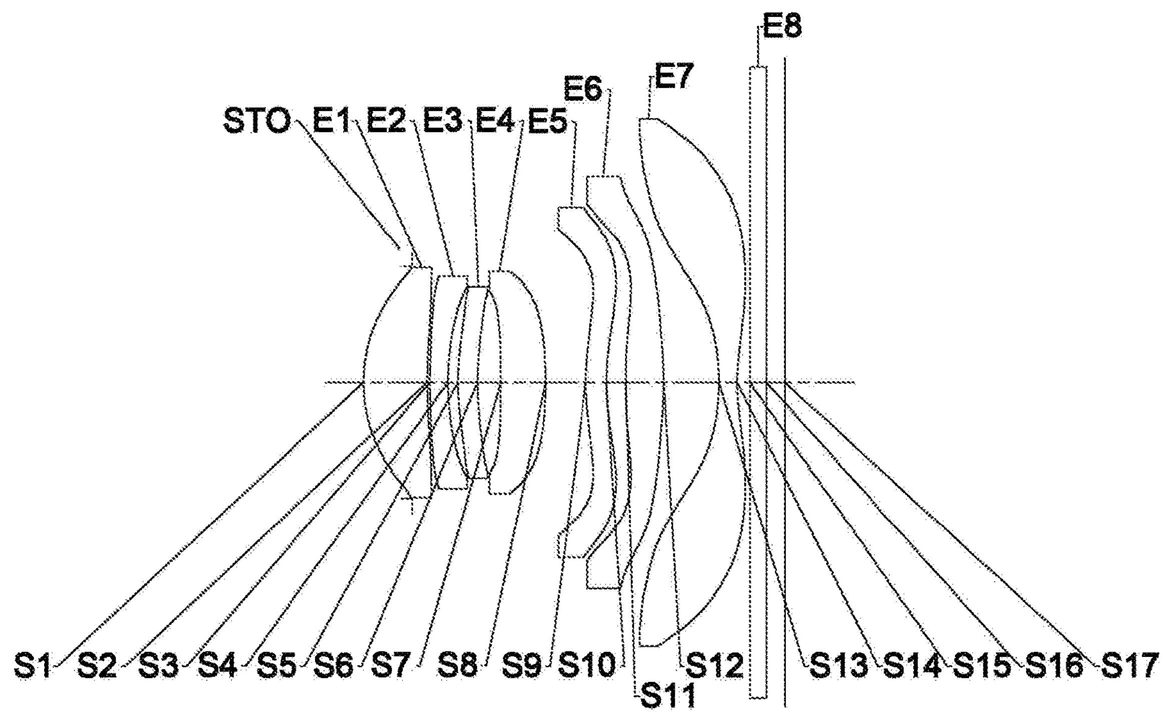
Fig. 9
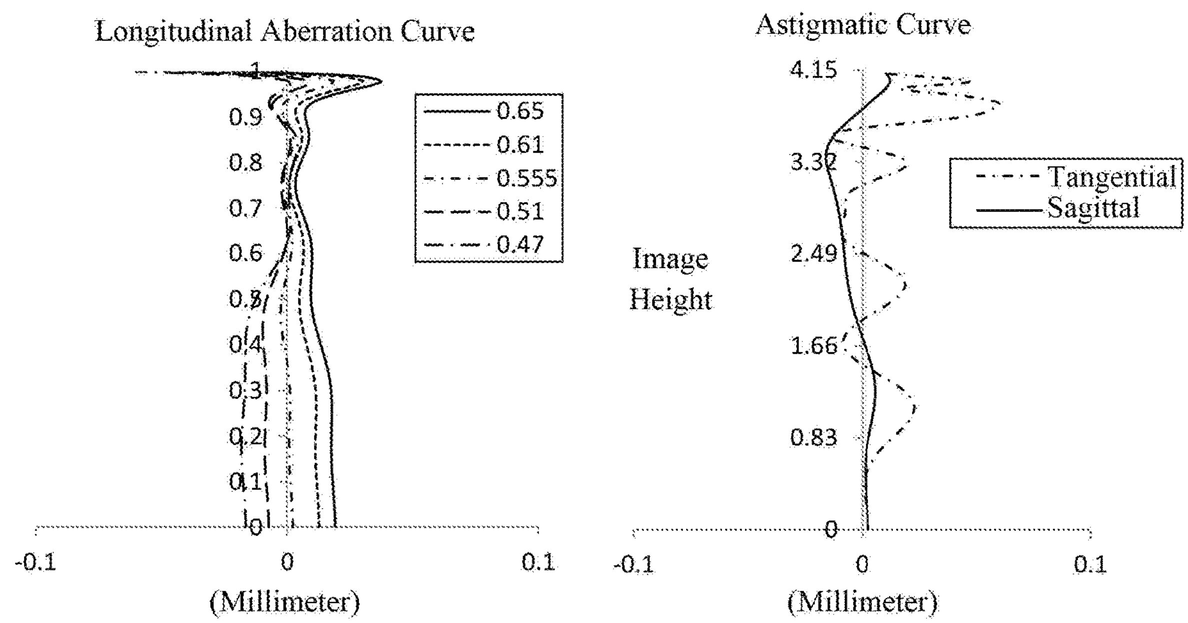
Fig. 10A
Fig. 10B

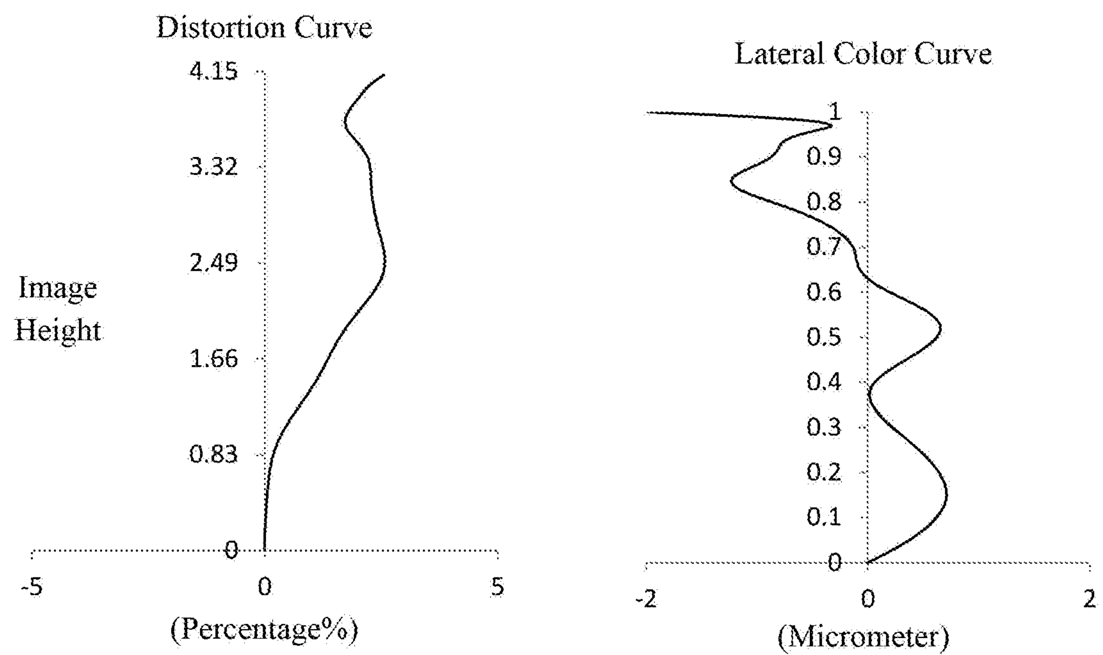
Fig. 10C
Fig. 10D
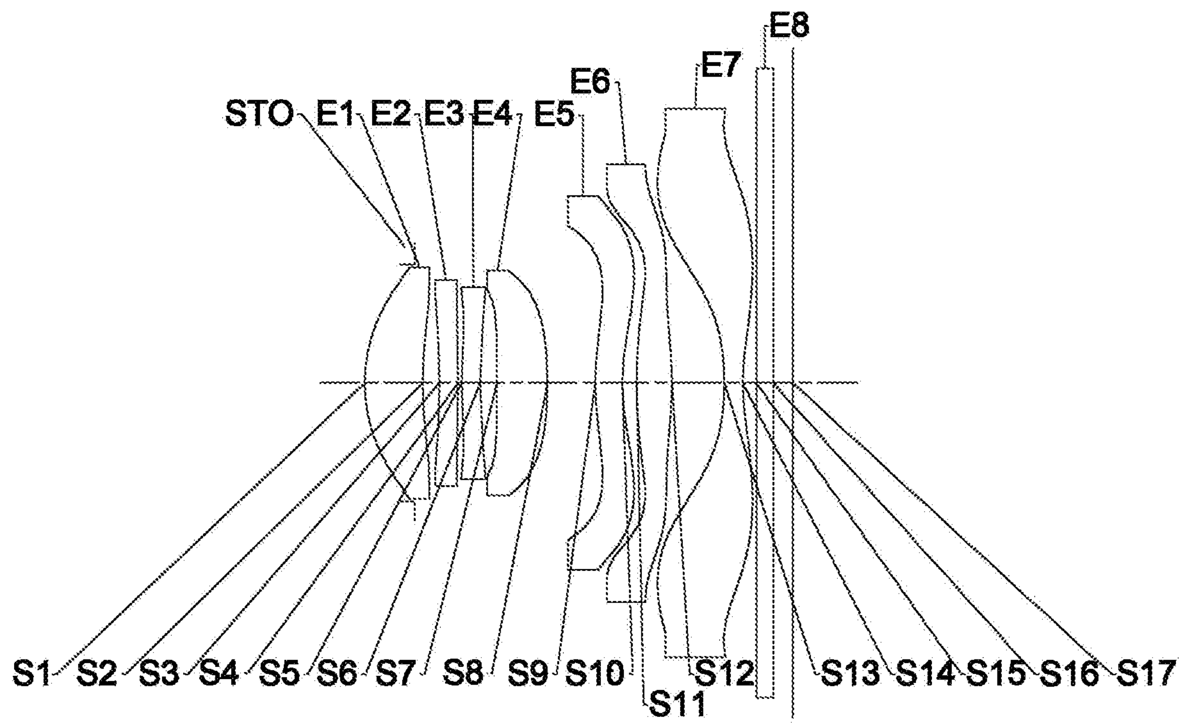
Fig. 11

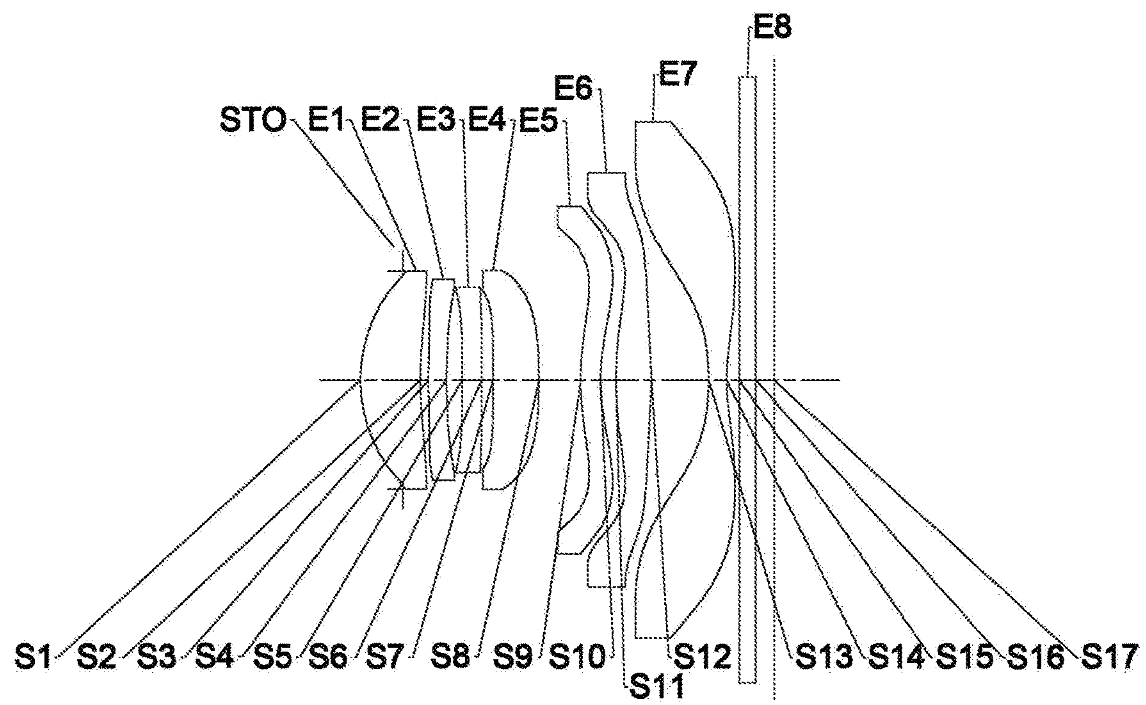
Fig. 13
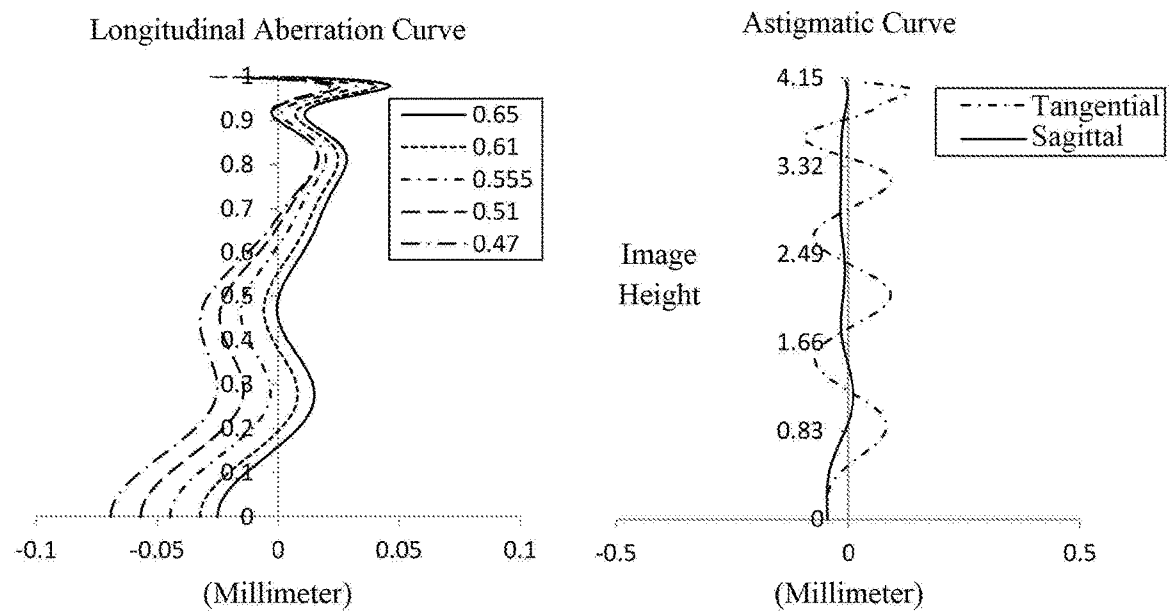
Fig. 14A
Fig. 14B

OPTICAL IMAGING LENS ASSEMBLY INCLUDING SEVEN LENSES OF +−++−+−, ++−+−+−, +−−+−+−, +−+−++− OR +−++++− REFRACTIVE POWERS

CROSS-REFERENCE TO RELATED APPLICATION

This application claims benefit of priority to Chinese Patent Application No. 201911069552.7 filed on Nov. 5, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

In recent years, with the rapid development of mobile phone shooting technology, mobile phone built-in lens assemblies with high image quality have become more and more popular in the market. At the same time, with the continuous changes in market demand, people put forward higher requirements on the performance and configuration of the built-in optical imaging lens assembly in the mobile phone. On the one hand, as the thickness of the mobile phone becomes thinner, the market requires that the built-in optical imaging lens assembly should be miniaturized, light and thin. On the other hand, as the performance of CCD and CMOS image sensors in mobile phones increases and the size thereof reduces, the market requires the optical imaging lens assembly applicable to the image sensors to have the characteristics of large aperture and large imaging plane to cooperate with the image sensor, thus improving the shooting quality of the mobile phones.

SUMMARY

In one aspect, the present disclosure provides an optical imaging lens assembly which includes, sequentially from an object side to an image side along an optical axis, a first lens having positive refractive power with a convex object-side surface and a concave image-side surface; a second lens having refractive power; a third lens having refractive power with a concave image-side surface; a fourth lens having positive refractive power; a fifth lens having refractive power with a convex object-side surface and a concave image-side surface; a sixth lens having positive refractive power with a convex object-side surface and a convex image-side surface; and a seventh lens having negative refractive power with a concave object-side surface and a concave image-side surface.

In one embodiment, a distance TTL along the optical axis from the object-side surface of the first lens to an imaging plane of the optical imaging lens assembly, half of a diagonal length ImgH of an effective pixel area on the imaging plane of the optical imaging lens assembly and a total effective focal length f of the optical imaging lens assembly satisfy: $5.00\text{ mm}<TTL/ImgH*f<6.00\text{ mm}$.

In one embodiment, a distance TTL along the optical axis from the object-side surface of the first lens to an imaging plane of the optical imaging lens assembly and half of a diagonal length ImgH of an effective pixel area on the imaging plane of the optical imaging lens assembly satisfy: $TTL/ImgH<1.30$.

In one embodiment, half of a diagonal length ImgH of an effective pixel area on an imaging plane of the optical imaging lens assembly, a total effective focal length f of the optical imaging lens assembly and half of a maximal field-of-view Semi-FOV of the optical imaging lens assembly satisfy: $17.00\text{ mm}^2<ImgH*f/\tan^2(\text{Semi-FOV})<21.00\text{ mm}^2$.

In one embodiment, an effective focal length f1 of the first lens and an effective focal length f6 of the sixth lens satisfy: $0.50<f1/f6<1.50$.

In one embodiment, a combined focal length f56 of the fifth lens and the sixth lens and a distance BFL along the optical axis from an image-side surface of the lens closest to an imaging plane to the imaging plane satisfy: $7.00<f56/BFL<12.00$.

In one embodiment, a radius of curvature R2 of the image-side surface of the first lens and a total effective focal length f of the optical imaging lens assembly satisfy: $0.50<R2/f<2.00$.

In one embodiment, a radius of curvature R13 of the object-side surface of the seventh lens and a radius of curvature R14 of the image-side surface of the seventh lens satisfy: $5.00<(R13-R14)/(R13+R14)<8.00$.

In one embodiment, a spaced interval T67 between the sixth lens and the seventh lens along the optical axis and a spaced interval T56 between the fifth lens and the sixth lens along the optical axis satisfy: $2.00<T67/T56<5.00$.

In one embodiment, a center thickness CT6 of the sixth lens along the optical axis and a center thickness CT7 of the seventh lens along the optical axis satisfy: $2.00<(CT6+CT7)/(CT6-CT7)<4.00$.

In one embodiment, SAG51, being an on-axis distance from an intersection of the object-side surface of the fifth lens and the optical axis to a vertex of an effective radius of the object-side surface of the fifth lens, and SAG52, being an on-axis distance from an intersection of the image-side surface of the fifth lens and the optical axis to a vertex of an effective radius of the image-side surface of the fifth lens, satisfy: $0.50<SAG51/SAG52<1.50$.

In one embodiment, a maximum effective radius DT72 of the image-side surface of the seventh lens and a maximum effective radius DT11 of the object-side surface of the first lens satisfy: $2.00<DT72/DT11<3.00$.

In one embodiment, half of a diagonal length ImgH of an effective pixel area on an imaging plane of the optical imaging lens assembly satisfies: $ImgH>4.10\text{ mm}$.

In one embodiment, the optical imaging lens assembly further includes a stop, and the stop is disposed at the object-side surface of the first lens.

The optical imaging lens assembly provided by the present disclosure includes a plurality of lenses, such as the first lens to the seventh lens. By reasonably setting the relationship among the distance along the optical axis from the object-side surface of the first lens to the imaging plane of the optical imaging lens assembly, half of the diagonal length of the effective pixel area on the imaging plane of the optical imaging lens assembly and the total effective focal length of the optical imaging lens assembly, and optimizing the refractive power and surface shape of each lens, the optical imaging lens assembly may be miniaturized, light and thin, and has the characteristics of large aperture and large imaging plane.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging lens assembly according to example 1 of the present disclosure;

FIGS. 2A to 2D illustrate a longitudinal aberration curve, an astigmatic curve, a distortion curve, and a lateral color curve of the optical imaging lens assembly of the example 1, respectively;

FIG. 3 illustrates a schematic structural view of an optical imaging lens assembly according to example 2 of the present disclosure;

FIGS. 6A to 6D illustrate a longitudinal aberration curve, an astigmatic curve, a distortion curve, and a lateral color curve of the optical imaging lens assembly of the example 3, respectively;

FIG. 7 illustrates a schematic structural view of an optical imaging lens assembly according to example 4 of the present disclosure;

FIG. 9 illustrates a schematic structural view of an optical imaging lens assembly according to example 5 of the present disclosure;

FIGS. 10A to 10D illustrate a longitudinal aberration curve, an astigmatic curve, a distortion curve, and a lateral color curve of the optical imaging lens assembly of the example 5, respectively;

FIG. 11 illustrates a schematic structural view of an optical imaging lens assembly according to example 6 of the present disclosure;

FIG. 13 illustrates a schematic structural view of an optical imaging lens assembly according to example 7 of the present disclosure;

FIGS. 14A to 14D illustrate a longitudinal aberration curve, an astigmatic curve, a distortion curve, and a lateral color curve of the optical imaging lens assembly of the example 7, respectively;

DETAILED DESCRIPTION OF EMBODIMENTS

Figure 4A:
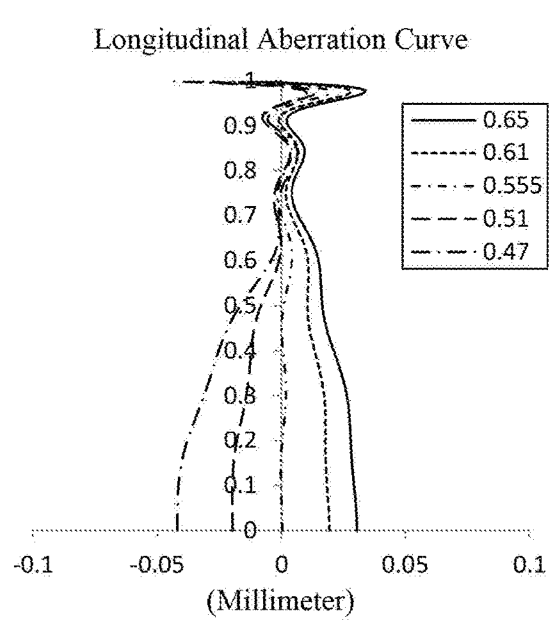
FIGS. 4A to 4D illustrate a longitudinal aberration curve, an astigmatic curve, a distortion curve, and a lateral color curve of the optical imaging lens assembly of the example 2, respectively.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include seven lenses having refractive power, which are a first lens, a second lens, a third lens, a fourth lens, a fifth lens, a sixth lens and a seventh lens. The seven lenses are arranged sequentially from an object side to an image side along an optical axis. There may be an air interval between each two adjacent lenses.

In an exemplary embodiment, the first lens may have positive refractive power, an object-side surface thereof is a convex surface, and an image-side surface thereof is a concave surface; the second lens may have positive or negative refractive power; the third lens may have positive or negative refractive power, and an image-side surface thereof is a concave surface; the fourth lens may have positive refractive power; the fifth lens may have positive or negative refractive power, an object-side surface thereof is a convex surface, and an image-side surface thereof is a concave surface; the sixth lens may have positive refractive power, an object-side surface thereof is a convex surface, and an image-side surface thereof is a convex surface; and the seventh lens may have negative refractive power, an object-side surface thereof is a concave surface, and an image-side surface thereof is a concave surface. By reasonably configuring the refractive power and surface shape of each lens in the optical system, the aberrations of the optical system may be effectively compensated, thereby improving the image quality.

In an exemplary embodiment, a distance TTL along the optical axis from the object-side surface of the first lens to an imaging plane of the optical imaging lens assembly, half of a diagonal length ImgH of an effective pixel area on the imaging plane of the optical imaging lens assembly and a total effective focal length f of the optical imaging lens assembly satisfy: 5.00 mm<TTL/ImgH*f<6.00 mm. By reasonably configuring the relationship among the distance along the optical axis from the object-side surface of the first lens to the imaging plane of the optical imaging lens assembly, half of the diagonal length of the effective pixel area on the imaging plane of the optical imaging lens assembly and the total effective focal length of the optical imaging lens assembly, it is beneficial to reduce the total size of the lens group, thereby achieving the miniaturization of the lens assembly. Further, it is beneficial to control the focal length of the camera lens assembly, so that the camera lens assembly may achieve high-definition imaging in both close-range shooting and long-range shooting conditions.

In an exemplary embodiment, a distance TTL along the optical axis from the object-side surface of the first lens to an imaging plane of the optical imaging lens assembly and half of a diagonal length ImgH of an effective pixel area on the imaging plane of the optical imaging lens assembly satisfy: TTL/ImgH<1.30, for example, 1.20<TTL/ImgH<1.30. By reasonably setting the proportional relationship between the distance along the optical axis from the object-side surface of the first lens to the imaging plane of the optical imaging lens assembly and half of the diagonal length of the effective pixel area on the imaging plane of the optical imaging lens assembly, it is beneficial for the optical imaging lens assembly to have a large imaging plane while effectively controlling the size of the optical imaging lens group, which achieves the ultra-thin characteristics of the optical imaging lens group, and enables the optical imaging lens assembly to be compatible with a large-size photosensitive surface to effectively improve the imaging efficiency of the lens assembly.

In an exemplary embodiment, half of a diagonal length ImgH of an effective pixel area on an imaging plane of the optical imaging lens assembly, a total effective focal length f of the optical imaging lens assembly and half of a maximal field-of-view Semi-FOV of the optical imaging lens assembly satisfy: 17.00 $mm^2$<ImgH*f/$tan^2$(Semi-FOV)<21.00 $mm^2$. By reasonably configuring the relationship among the above mentioned three parameters, it is beneficial for the optical imaging lens group to increase the field-of-view angle of the lens group and broaden the imaging view on the basis of having a ultra-large image plane, thereby improving the use efficiency of the large-size imaging area.

In an exemplary embodiment, an effective focal length f1 of the first lens and an effective focal length f6 of the sixth lens satisfy: 0.50<f1/f6<1.50, for example, 0.70<f1/f6<1.50. By reasonably distributing the effective focal lengths of the first lens and the sixth lens, the deflection angle of the light may be reduced, thereby improving the image quality of the camera lens group.

In an exemplary embodiment, a combined focal length f56 of the fifth lens and the sixth lens and a distance BFL along the optical axis from an image-side surface of the lens closest to an imaging plane to the imaging plane satisfy: 7.00<f56/BFL<12.00. By configuring the ratio of the combined focal length of the fifth lens and the sixth lens and the distance along the optical axis from the image-side surface of the lens closest to the imaging plane to the imaging plane within a reasonable numerical range, the optical back focal length of the optical imaging lens assembly may satisfy the using requirements, which is beneficial to achieving the automatic focusing of the optical imaging lens group.

In an exemplary embodiment, a radius of curvature R2 of the image-side surface of the first lens and a total effective focal length f of the optical imaging lens assembly satisfy: 0.50<R2/f<2.00, for example, 0.80<R2/f<1.70. By reasonably configuring the proportional relationship between the radius of curvature of the image-side surface of the first lens and the total effective focal length of the optical imaging lens assembly, it is beneficial to the molding and demolding of the first lens, thereby enhancing the manufacturability of the first lens.

In an exemplary embodiment, a radius of curvature R13 of the object-side surface of the seventh lens and a radius of curvature R14 of the image-side surface of the seventh lens satisfy: 5.00<(R13−R14)/(R13+R14)<8.00. By reasonably configuring the radius of curvature of the object-side surface of the seventh lens and the radius of curvature of the image-side surface of the seventh lens, it is beneficial to constrain the refractive power of the seventh lens of the optical imaging lens group, thereby correcting the aberrations of the lens system.

In an exemplary embodiment, a spaced interval T67 between the sixth lens and the seventh lens along the optical axis and a spaced interval T56 between the fifth lens and the sixth lens along the optical axis satisfy: 2.00<T67/T56<5.00. By reasonably configuring the proportional relationship between T67 and T56, it is beneficial to compensate the field curvature of the optical imaging lens group, so that the optical system has a reasonable field curvature.

In an exemplary embodiment, a center thickness CT6 of the sixth lens along the optical axis and a center thickness CT7 of the seventh lens along the optical axis satisfy: 2.00<(CT6+CT7)/(CT6−CT7)<4.00. By reasonably configuring the center thickness of the sixth lens along the optical axis and the center thickness of the seventh lens along the optical axis to satisfy the above conditional, it is beneficial to compensate the field curvature of the optical imaging lens group, so that the optical system has a reasonable field curvature.

In an exemplary embodiment, SAG51, being an on-axis distance from an intersection of the object-side surface of the fifth lens and the optical axis to a vertex of an effective radius of the object-side surface of the fifth lens, and SAG52, being an on-axis distance from an intersection of the image-side surface of the fifth lens and the optical axis to a vertex of an effective radius of the image-side surface of the fifth lens, satisfy: 0.50<SAG51/SAG52<1.50, for example, 0.50<SAG51/SAG52<1.30. By reasonably configuring the proportional relationship between SAG51 and SAG52, it is beneficial to the processing and molding of the fifth lens, so that the lens has a good image effect.

In an exemplary embodiment, a maximum effective radius DT72 of the image-side surface of the seventh lens and a maximum effective radius DT11 of the object-side surface of the first lens satisfy: 2.00<DT72/DT11<3.00, for example, 2.00<DT72/DT11<2.50. By reasonably configuring the proportional relationship between DT72 and DT11, it is beneficial to reduce the size of the front and rear ends of the lens assembly, thereby reducing the level difference. Further, it is beneficial to limit the range of the incident light, remove poor-quality edge light, and reduce off-axis aberration, thereby improving the resolution of the optical imaging lens group.

In an exemplary embodiment, half of a diagonal length ImgH of an effective pixel area on an imaging plane of the optical imaging lens assembly satisfies: ImgH>4.10 mm, for example, 4.10 mm<ImgH<4.20 mm. By configuring the half of a diagonal length of the effective pixel area on the imaging plane of the optical imaging lens assembly to satisfy the above conditional, it is beneficial to achieve that the lens assembly has the characteristics of a large image plane, so that the optical imaging lens group has a relatively high resolution, thereby improving the imaging clarity of the optical system.

In an exemplary embodiment, the above optical imaging lens assembly may further include a stop. The stop may be disposed at an appropriate position as required. For example, the stop may be disposed between the object side and the first lens. Specifically, the stop may be located at the object-side surface of the first lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as seven lenses as described above. The optical imaging lens assembly of the present disclosure satisfies the requirements of large aperture, large image plane, high pixels, portability, etc., and may perform high-definition imaging in both close-range and long-range shooting.

In an exemplary embodiment, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

Exemplary embodiments of the present disclosure also provide an electronic device including the imaging apparatus described above.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 is a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material: Refractive index | Material: Abbe number | Focal length | Conic coefficient |
|---|---|---|---|---|---|---|---|
| OBJ | Spherical | Infinite | Infinite | | | | |
| STO | Spherical | Infinite | −0.6200 | | | | |
| S1 | Aspheric | 1.9014 | 0.7452 | 1.56 | 58.4 | 4.96 | 0.2654 |
| S2 | Aspheric | 5.1228 | 0.1082 | | | | −0.8412 |
| S3 | Aspheric | 12.1489 | 0.2500 | 1.67 | 20.4 | −11.13 | 6.2245 |
| S4 | Aspheric | 4.5711 | 0.1070 | | | | 0.6997 |
| S5 | Aspheric | 3.7253 | 0.2582 | 1.62 | 23.5 | 21.83 | 4.3948 |
| S6 | Aspheric | 4.9292 | 0.2667 | | | | 1.4335 |
| S7 | Aspheric | 49.2220 | 0.5184 | 1.55 | 56.1 | 15.46 | −99.0000 |
| S8 | Aspheric | −10.1453 | 0.4996 | | | | −21.9760 |
| S9 | Aspheric | 3.2632 | 0.2680 | 1.67 | 20.4 | −36.78 | −0.2152 |
| S10 | Aspheric | 2.7855 | 0.1673 | | | | −29.0980 |
| S11 | Aspheric | 9.0906 | 0.4375 | 1.55 | 56.1 | 5.09 | 2.3817 |
| S12 | Aspheric | −3.9379 | 0.7720 | | | | −0.0826 |
| S13 | Aspheric | −3.5677 | 0.2500 | 1.54 | 55.9 | −2.69 | −0.1464 |
| S14 | Aspheric | 2.4942 | 0.1581 | | | | −0.5309 |
| S15 | Spherical | Infinite | 0.2100 | 1.52 | 64.2 | | |
| S16 | Spherical | Infinite | 0.1638 | | | | |
| S17 | Spherical | Infinite | | | | | |

In this example, a total effective focal length f of the optical imaging lens assembly satisfies f=4.26 mm, a distance TTL along the optical axis from the object-side surface S1 of the first lens E1 to the imaging plane S17 satisfies TTL=5.18 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=43.7°, and an aperture value Fno of the optical imaging lens assembly satisfies Fno=1.48.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \sum Aih^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 |
|---|---|---|---|---|---|
| S1 | −2.4532E−04 | −2.5544E−02 | 7.1053E−02 | −1.2790E−01 | 1.3985E−01 |
| S2 | −1.1906E−02 | 1.0689E−02 | −6.0785E−02 | 1.0210E−01 | −1.0672E−01 |
| S3 | −3.1543E−03 | 5.5669E−03 | 1.3907E−02 | −9.3836E−02 | 1.9348E−01 |
| S4 | −1.8573E−02 | 9.7819E−02 | −2.5651E−01 | 5.2107E−01 | −7.1129E−01 |
| S5 | −7.2180E−02 | 2.7386E−03 | 8.2860E−02 | −3.1809E−01 | 5.5136E−01 |
| S6 | −4.5772E−02 | 5.3755E−02 | −2.2600E−01 | 5.8292E−01 | −9.7740E−01 |
| S7 | −1.1818E−02 | −2.1199E−01 | 8.0977E−01 | −1.9761E+00 | 2.9793E+00 |
| S8 | −5.6891E−02 | 4.3007E−02 | −1.5440E−01 | 2.8606E−01 | −3.4310E−01 |
| S9 | −7.9447E−02 | −1.1363E−02 | 3.1007E−02 | 8.7657E−03 | 4.1700E−02 |
| S10 | 1.3754E−01 | −3.4240E−01 | 3.6266E−01 | −2.2755E−01 | 8.7428E−02 |
| S11 | 1.5639E−01 | −2.3153E−01 | 1.5338E−01 | −6.7258E−02 | 2.1323E−02 |
| S12 | 1.3229E−01 | −6.3217E−02 | −4.3254E−03 | 1.8359E−02 | −8.8958E−03 |
| S13 | −1.2009E−01 | 9.2363E−02 | −4.7769E−02 | 1.7302E−02 | −3.9597E−03 |
| S14 | −1.7813E−01 | 1.0294E−01 | −4.4768E−02 | 1.3568E−02 | −2.8119E−03 |

| Surface number | A14 | A16 | A18 | A20 |
|---|---|---|---|---|
| S1 | −9.5573E−02 | 3.9462E−02 | −9.0138E−03 | 8.6092E−04 |
| S2 | 7.7117E−02 | −3.6316E−02 | 9.7395E−03 | −1.1201E−03 |
| S3 | −1.9712E−01 | 1.1109E−01 | −3.3260E−02 | 4.1374E−03 |
| S4 | 6.2204E−01 | −3.2666E−01 | 8.8219E−02 | −7.9603E−03 |
| S5 | −5.6272E−01 | 3.4649E−01 | −1.1914E−01 | 1.8198E−02 |

TABLE 2-continued

| | | | | |
|---|---|---|---|---|
| S6 | 1.0477E+00 | −6.8739E−01 | 2.5333E−01 | −3.9588E−02 |
| S7 | −2.8370E+00 | 1.6558E+00 | −5.4169E−01 | 7.6355E−02 |
| S8 | 2.5727E−01 | −1.1718E−01 | 2.9667E−02 | −3.2046E−03 |
| S9 | 3.1097E−02 | −1.0893E−02 | 1.8967E−03 | −1.3174E−04 |
| S10 | −2.0520E−02 | 2.8192E−03 | −2.0234E−04 | 5.5467E−06 |
| S11 | −4.9496E−03 | 7.7103E−04 | −6.8530E−05 | 2.5438E−06 |
| S12 | 2.1191E−03 | −2.7690E−04 | 1.9010E−05 | −5.3776E−07 |
| S13 | 5.5663E−04 | −4.6698E−05 | 2.1500E−06 | 4.1883E−08 |
| S14 | 3.8196E−04 | −3.2045E−05 | 1.4933E−06 | −2.9427E−08 |

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=4.25 mm, a distance TTL along the optical axis from the object-side surface S1 of the first lens E1 to the imaging plane S17 satisfies TTL=5.33 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=43.4°, and an aperture value Fno of the optical imaging lens assembly satisfies Fno=1.49.

Table 3 is a table illustrating basic parameters of the optical imaging lens assembly of example 2, wherein the units for the radius of curvature, the thickness/distance and the focal length are millimeter (mm).

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6200 | | | | |
| S1 | Aspheric | 1.9320 | 0.7721 | 1.56 | 58.4 | 6.53 | 0.2279 |
| S2 | Aspheric | 3.4875 | 0.0533 | | | | −1.0000 |
| S3 | Aspheric | 5.0989 | 0.2300 | 1.67 | 20.4 | 200.26 | −2.4649 |
| S4 | Aspheric | 5.2059 | 0.1673 | | | | 1.1841 |
| S5 | Aspheric | 4.8064 | 0.2300 | 1.62 | 23.5 | −1096.43 | −2.7458 |
| S6 | Aspheric | 4.6844 | 0.2561 | | | | 6.0400 |
| S7 | Aspheric | −94.2153 | 0.5579 | 1.55 | 56.1 | 13.13 | 15.9105 |
| S8 | Aspheric | −6.6760 | 0.5188 | | | | 1.7366 |
| S9 | Aspheric | 3.8124 | 0.2943 | 1.67 | 20.4 | −40.37 | −1.5846 |
| S10 | Aspheric | 3.2361 | 0.1831 | | | | −24.1217 |
| S11 | Aspheric | 9.6028 | 0.5126 | 1.55 | 56.1 | 4.84 | 0.9655 |
| S12 | Aspheric | −3.5740 | 0.7030 | | | | −0.2477 |
| S13 | Aspheric | −3.6772 | 0.2300 | 1.54 | 55.9 | −2.73 | −0.1672 |
| S14 | Aspheric | 2.4874 | 0.1693 | | | | −0.5367 |

TABLE 3-continued

| Surface number | Surface type | Radius of curvature | Thickness/ Distance | Material: Refractive index | Material: Abbe number | Focal length | Conic coefficient |
|---|---|---|---|---|---|---|---|
| S15 | Spherical | Infinite | 0.2100 | 1.52 | 64.2 | | |
| S16 | Spherical | Infinite | 0.2421 | | | | |
| S17 | Spherical | Infinite | | | | | |

In example 2, the object-side surface and the image-side surface of any one of the first lens E1 to the seventh lens E7 are aspheric. Table 4 below shows high-order coefficients A4, A6, A8, A10, A12, A14, A16, A18 and A20 applicable to each aspheric surface S1 to S14 in example 2.

TABLE 4

| Surface number | A4 | A6 | A8 | A10 | A12 |
|---|---|---|---|---|---|
| S1 | −4.0520E−03 | −9.1336E−03 | 2.6237E−02 | −5.4901E−02 | 7.0776E−02 |
| S2 | −8.4141E−02 | −3.2966E−02 | 1.5248E−01 | −2.8155E−01 | 3.7535E−01 |
| S3 | −9.3591E−02 | −9.6970E−03 | 2.5677E−01 | −5.4908E−01 | 7.1628E−01 |
| S4 | −3.6037E−02 | 5.0912E−02 | 1.2075E−02 | 1.1161E−01 | −5.1198E−01 |
| S5 | −5.8850E−02 | 3.9857E−02 | −6.5528E−02 | 7.4782E−02 | −7.4184E−02 |
| S6 | −5.0053E−02 | 3.0882E−02 | −1.2250E−01 | 3.4609E−01 | −6.3069E−01 |
| S7 | −3.7223E−02 | −1.3211E−02 | 3.8181E−02 | −1.2088E−01 | 1.3855E−01 |
| S8 | −4.9812E−02 | 1.0423E−02 | −3.7867E−02 | 6.0520E−02 | −7.1047E−02 |
| S9 | −4.3672E−02 | −8.2404E−02 | 1.3604E−01 | −1.0060E−01 | 3.6506E−02 |
| S10 | 1.1078E−01 | −2.9500E−01 | 3.0963E−01 | −1.9040E−01 | 7.2274E−02 |
| S11 | 1.3295E−01 | −2.0125E−01 | 1.3922E−01 | −6.3134E−02 | 2.0084E−02 |
| S12 | 1.1358E−01 | −5.3768E−02 | 8.2630E−04 | 1.1210E−02 | −5.6199E−03 |
| S13 | −8.8973E−02 | 4.5641E−02 | −1.7157E−02 | 6.2066E−03 | −1.5605E−03 |
| S14 | −1.6231E−01 | 8.8265E−02 | −3.6968E−02 | 1.0665E−02 | −2.0617E−03 |

| Surface number | A14 | A16 | A18 | A20 |
|---|---|---|---|---|
| S1 | −5.7063E−02 | 2.7448E−02 | −7.2050E−03 | 7.8036E−04 |
| S2 | −3.1817E−01 | 1.5735E−01 | −4.1297E−02 | 4.4321E−03 |
| S3 | −5.9131E−01 | 2.9312E−01 | −7.8740E−02 | 8.7718E−03 |
| S4 | 7.8562E−01 | −6.1339E−01 | 2.4548E−01 | −3.9560E−02 |
| S5 | 5.4861E−02 | −3.3972E−02 | 1.8416E−02 | −4.3715E−03 |
| S6 | 7.1293E−01 | −4.8462E−01 | 1.8435E−01 | −2.9814E−02 |
| S7 | −5.2820E−02 | −3.4214E−02 | 3.5641E−02 | −8.4009E−03 |
| S8 | 5.1514E−02 | −2.2578E−02 | 5.4740E−03 | −5.6630E−04 |
| S9 | −4.7642E−03 | −8.8852E−04 | 3.5545E−04 | −3.1648E−05 |
| S10 | −1.7067E−02 | 2.4258E−03 | −1.8837E−04 | 6.0781E−06 |
| S11 | −4.5892E−03 | 7.0609E−04 | −6.3033E−05 | 2.4016E−06 |
| S12 | 1.3300E−03 | −1.7067E−04 | 1.1443E−05 | −3.1493E−07 |
| S13 | 2.3988E−04 | −2.1664E−05 | 1.0617E−06 | −2.1873E−08 |
| S14 | 2.5862E−04 | −2.0052E−05 | 8.6934E−07 | −1.6072E−08 |

Figure 4B:
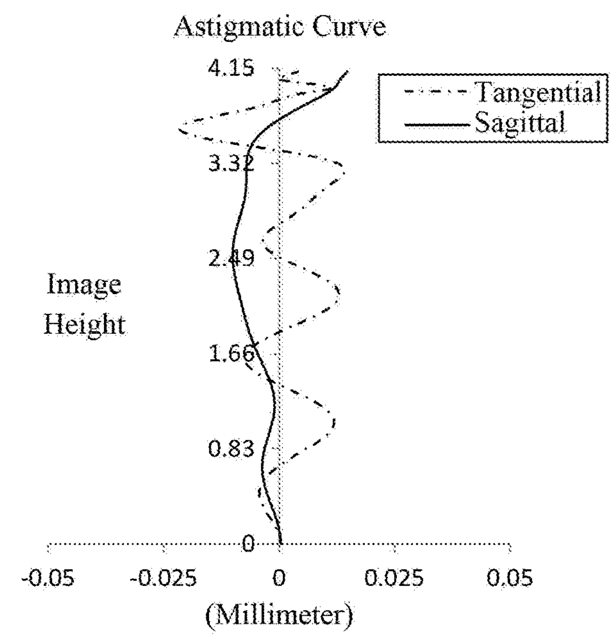
Figure 4C:
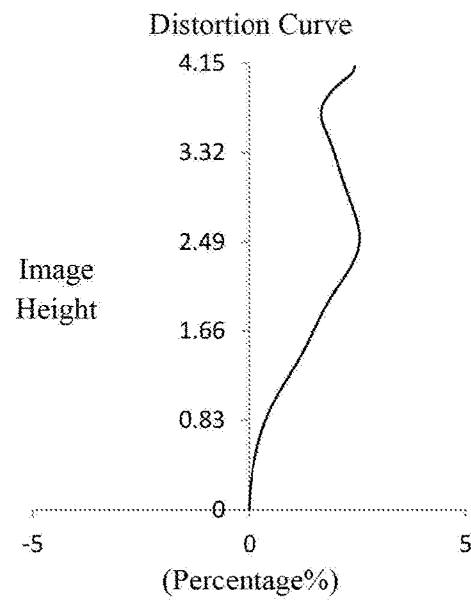
Figure 4D:
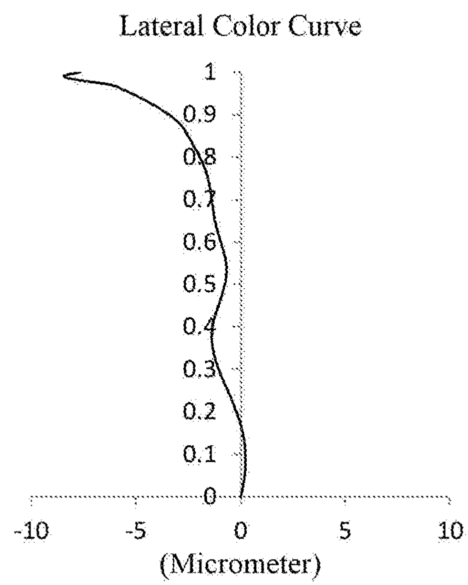

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

Figure 5:
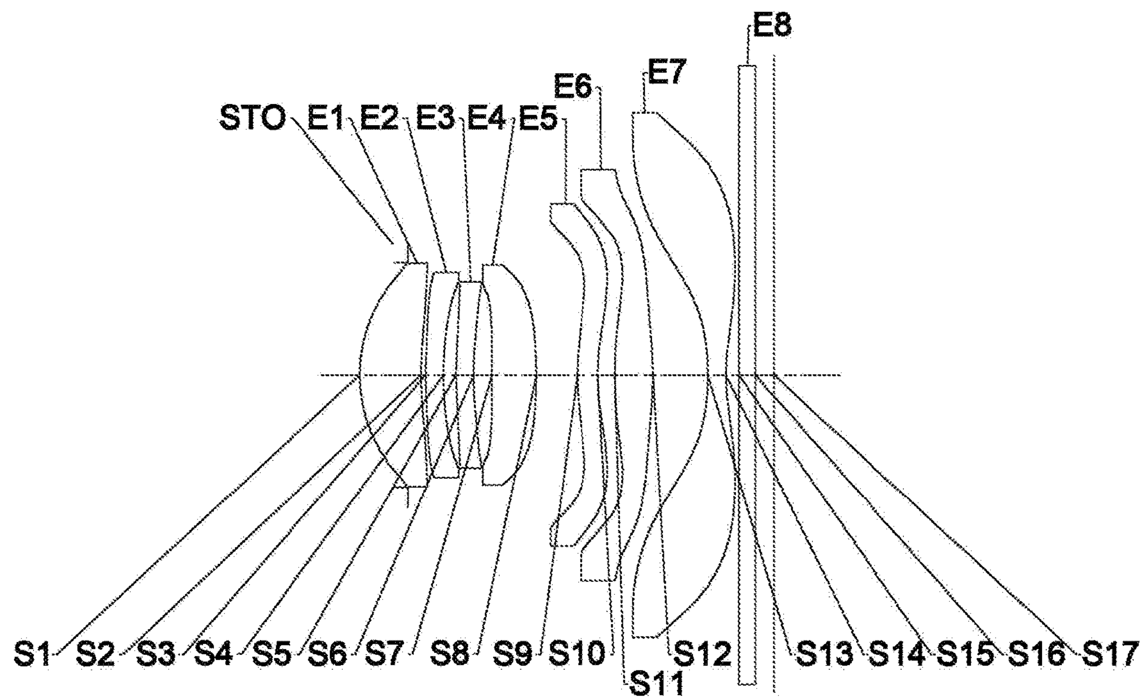
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=4.26 mm, a distance TTL along the optical axis from the object-side surface S1 of the first lens E1 to the imaging plane S17 satisfies TTL=5.33 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=43.3°, and an aperture value Fno of the optical imaging lens assembly satisfies Fno=1.49.

Table 5 is a table illustrating basic parameters of the optical imaging lens assembly of example 3, wherein the units for the radius of curvature, the thickness/distance and the focal length are millimeter (mm).

TABLE 5

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6200 | | | | |
| S1 | Aspheric | 1.9277 | 0.7886 | 1.56 | 58.4 | 5.12 | 0.2398 |
| S2 | Aspheric | 4.9703 | 0.0579 | | | | −1.0000 |
| S3 | Aspheric | 8.4599 | 0.2300 | 1.67 | 20.4 | −20.53 | −2.9789 |
| S4 | Aspheric | 5.1708 | 0.1573 | | | | 1.9285 |
| S5 | Aspheric | 5.0132 | 0.2300 | 1.62 | 23.5 | −100.00 | −19.1186 |
| S6 | Aspheric | 4.5678 | 0.2344 | | | | 7.3677 |
| S7 | Aspheric | 55.0824 | 0.5711 | 1.55 | 56.1 | 11.85 | 16.9854 |
| S8 | Aspheric | −7.3033 | 0.5292 | | | | 1.8380 |
| S9 | Aspheric | 3.3490 | 0.2645 | 1.67 | 20.4 | −45.55 | −2.6861 |
| S10 | Aspheric | 2.9210 | 0.2221 | | | | −23.1348 |
| S11 | Aspheric | 8.5867 | 0.4915 | 1.55 | 56.1 | 4.82 | −0.9261 |
| S12 | Aspheric | −3.7141 | 0.7047 | | | | −0.2261 |
| S13 | Aspheric | −3.6741 | 0.2300 | 1.54 | 55.9 | −2.71 | −0.1573 |
| S14 | Aspheric | 2.4675 | 0.1680 | | | | −0.5379 |
| S15 | Spherical | Infinite | 0.2100 | 1.52 | 64.2 | | |
| S16 | Spherical | Infinite | 0.2407 | | | | |
| S17 | Spherical | Infinite | | | | | |

In example 3, the object-side surface and the image-side surface of any one of the first lens E1 to the seventh lens E7 are aspheric. Table 6 below shows high-order coefficients A4, A6, A8, A10, A12, A14, A16, A18 and A20 applicable to each aspheric surface S1 to S14 in example 3.

TABLE 6

| Surface number | A4 | A6 | A8 | A10 | A12 |
|---|---|---|---|---|---|
| S1 | −7.4461E−03 | 1.2968E−02 | −3.2655E−02 | 3.7772E−02 | −2.2688E−02 |
| S2 | −1.4289E−02 | −5.3780E−02 | −4.8040E−02 | 2.4182E−01 | −2.9240E−01 |
| S3 | 1.2517E−02 | −9.3567E−02 | 7.8983E−02 | 2.3148E−02 | −2.2577E−02 |
| S4 | 2.6331E−02 | −1.4320E−03 | −1.9087E−01 | 8.0723E−01 | −1.5859E+00 |
| S5 | −3.2635E−02 | 2.6911E−02 | −1.7368E−01 | 4.7315E−01 | −7.8624E−01 |
| S6 | −6.0016E−02 | 3.8345E−02 | −1.4130E−01 | 3.5882E−01 | −6.2117E−01 |
| S7 | −4.3348E−02 | 3.8783E−02 | −1.9439E−01 | 4.6209E−01 | −7.4216E−01 |
| S8 | −4.2910E−02 | −8.4758E−03 | 1.1342E−02 | −1.8478E−02 | 4.7297E−03 |
| S9 | −4.0233E−02 | −8.5901E−02 | 1.3813E−01 | −9.8611E−02 | 3.4059E−02 |
| S10 | 1.1230E−01 | −2.9441E−01 | 3.0742E−01 | −1.8662E−01 | 6.8834E−02 |
| S11 | 1.1629E−01 | −1.6003E−01 | 9.4473E−02 | −3.5296E−02 | 9.2539E−03 |
| S12 | 1.1788E−01 | −5.2915E−02 | −3.4792E−03 | 1.4349E−02 | −6.8009E−03 |
| S13 | −8.8923E−02 | 4.3355E−02 | −1.4140E−02 | 4.5955E−03 | −1.1045E−03 |
| S14 | −1.6779E−01 | 9.3110E−02 | −3.9798E−02 | 1.1749E−02 | −2.3276E−03 |

| Surface number | A14 | A16 | A18 | A20 |
|---|---|---|---|---|
| S1 | 3.6441E−03 | 2.9944E−03 | −1.6841E−03 | 2.4941E−04 |
| S2 | 1.8205E−01 | −6.4877E−02 | 1.2817E−02 | −1.1237E−03 |
| S3 | −4.8757E−02 | 5.8787E−02 | −2.3424E−02 | 3.2728E−03 |

TABLE 6-continued

| | | | | |
|---|---|---|---|---|
| S4 | 1.7918E+00 | −1.1968E+00 | 4.3658E−01 | −6.6369E−02 |
| S5 | 8.3218E−01 | −5.4897E−01 | 2.0560E−01 | −3.2747E−02 |
| S6 | 7.1611E−01 | −5.1461E−01 | 2.0826E−01 | −3.5619E−02 |
| S7 | 7.5935E−01 | −4.7671E−01 | 1.6508E−01 | −2.3841E−02 |
| S8 | 7.8346E−03 | −7.7487E−03 | 2.7298E−03 | −3.4986E−04 |
| S9 | −3.9811E−03 | −9.0682E−04 | 3.2479E−04 | −2.7775E−05 |
| S10 | −1.5494E−02 | 2.0460E−03 | −1.4180E−04 | 3.7858E−06 |
| S11 | −1.9341E−03 | 3.1151E−04 | −3.0822E−05 | 1.2991E−06 |
| S12 | 1.5878E−03 | −2.0321E−04 | 1.3639E−05 | −3.7630E−07 |
| S13 | 1.6526E−04 | −1.4552E−05 | 6.9386E−07 | −1.3874E−08 |
| S14 | 2.9898E−04 | −2.3686E−05 | 1.0463E−06 | −1.9655E−08 |

Figure 6A:
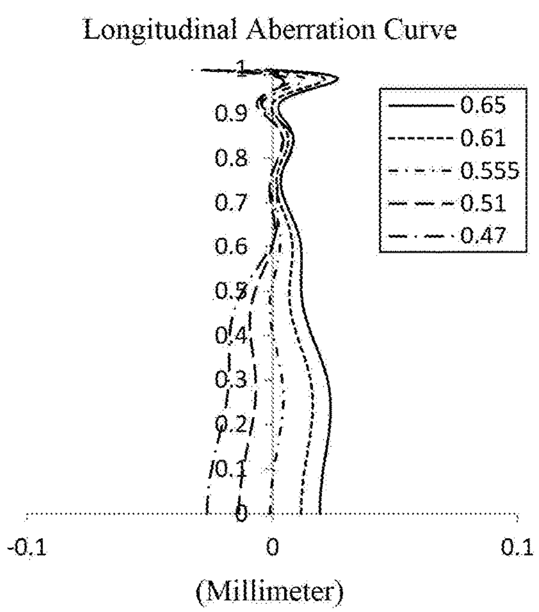
Figure 6B:
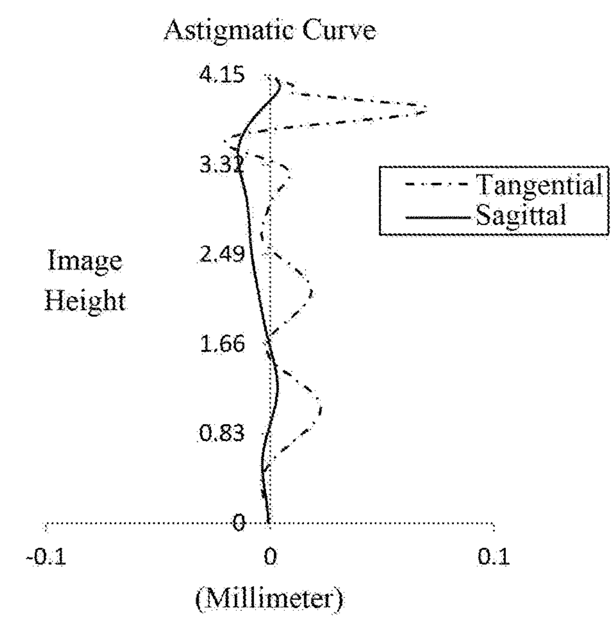

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=4.30 mm, a distance TTL along the optical axis from the object-side surface S1 of the first lens E1 to the imaging plane S17 satisfies TTL=5.33 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=43.1°, and an aperture value Fno of the optical imaging lens assembly satisfies Fno=1.49.

Table 7 is a table illustrating basic parameters of the optical imaging lens assembly of example 4, wherein the units for the radius of curvature, the thickness/distance and the focal length are millimeter (mm).

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6200 | | | | |
| S1 | Aspheric | 1.9280 | 0.8041 | 1.56 | 58.4 | 4.76 | 0.2788 |
| S2 | Aspheric | 5.8468 | 0.0559 | | | | −1.0000 |
| S3 | Aspheric | 7.8422 | 0.2300 | 1.67 | 20.4 | −11.41 | −0.7692 |
| S4 | Aspheric | 3.8156 | 0.1610 | | | | 0.9360 |
| S5 | Aspheric | 4.4197 | 0.2779 | 1.62 | 23.5 | 23.63 | 7.0120 |
| S6 | Aspheric | 6.0730 | 0.3177 | | | | 8.6387 |
| S7 | Aspheric | −44.7282 | 0.5368 | 1.55 | 56.1 | −202.05 | 15.3172 |
| S8 | Aspheric | −75.5533 | 0.2317 | | | | 1.7160 |
| S9 | Aspheric | 2.3281 | 0.2630 | 1.67 | 20.4 | 50.63 | −0.8596 |
| S10 | Aspheric | 2.3876 | 0.3238 | | | | −30.0464 |
| S11 | Aspheric | 7.5665 | 0.4652 | 1.55 | 56.1 | 4.74 | 0.5423 |
| S12 | Aspheric | −3.8481 | 0.8293 | | | | −0.2565 |

TABLE 7-continued

| Surface number | Surface type | Radius of curvature | Thickness/ Distance | Material: Refractive index | Material: Abbe number | Focal length | Conic coefficient |
|---|---|---|---|---|---|---|---|
| S13 | Aspheric | −3.6134 | 0.2300 | 1.54 | 55.9 | −2.80 | −0.1518 |
| S14 | Aspheric | 2.6232 | 0.1604 | | | | −0.5294 |
| S15 | Spherical | Infinite | 0.2100 | 1.52 | 64.2 | | |
| S16 | Spherical | Infinite | 0.2332 | | | | |
| S17 | Spherical | Infinite | | | | | |

In example 4, the object-side surface and the image-side surface of any one of the first lens E1 to the seventh lens E7 are aspheric. Table 8 below shows high-order coefficients A4, A6, A8, A10, A12, A14, A16, A18 and A20 applicable to each aspheric surface S1 to S14 in example 4.

TABLE 8

| Surface number | A4 | A6 | A8 | A10 | A12 |
|---|---|---|---|---|---|
| S1 | −8.0874E−03 | 1.3554E−02 | −2.7558E−02 | 1.8838E−02 | 7.9991E−03 |
| S2 | −3.9271E−02 | 3.0520E−03 | 4.7861E−02 | −1.1006E−01 | 1.3198E−01 |
| S3 | −5.0949E−02 | 2.0907E−02 | 1.1205E−01 | −3.2210E−01 | 4.5392E−01 |
| S4 | −2.8966E−02 | 6.3877E−02 | −1.4141E−01 | 4.1033E−01 | −8.2679E−01 |
| S5 | −5.0533E−02 | 4.6832E−02 | −2.2411E−01 | 5.8231E−01 | −9.7966E−01 |
| S6 | −2.4767E−02 | −7.0238E−04 | −3.2466E−03 | −1.5935E−02 | 4.2364E−02 |
| S7 | −3.8624E−02 | 9.2921E−03 | −7.2878E−02 | 1.5772E−01 | −2.8054E−01 |
| S8 | −1.2583E−01 | 1.4228E−01 | −2.0545E−01 | 2.0126E−01 | −1.5245E−01 |
| S9 | −1.8283E−01 | 7.9274E−02 | 1.9185E−02 | −5.3681E−02 | 2.6728E−02 |
| S10 | 1.0086E−01 | −3.3618E−01 | 4.2113E−01 | −3.0214E−01 | 1.3266E−01 |
| S11 | 5.7994E−02 | −1.0918E−01 | 9.0007E−02 | −4.9478E−02 | 1.8753E−02 |
| S12 | 1.0068E−01 | −5.2199E−02 | 1.5649E−02 | 4.5740E−05 | −1.9544E−03 |
| S13 | −9.3141E−02 | 5.3241E−02 | −2.0557E−02 | 6.5857E−03 | −1.4351E−03 |
| S14 | −1.7057E−01 | 1.0406E−01 | 4.8090E−02 | 1.4954E−02 | −3.0580E−03 |

| Surface number | A14 | A16 | A18 | A20 |
|---|---|---|---|---|
| S1 | −2.3900E−02 | 1.7055E−02 | −5.4935E−03 | 6.7145E−04 |
| S2 | −9.1273E−02 | 3.5300E−02 | −6.8254E−03 | 4.6874E−04 |
| S3 | −3.7175E−01 | 1.7751E−01 | 4.5488E−02 | 4.8158E−03 |
| S4 | 9.9854E−01 | −7.0196E−01 | 2.6460E−01 | −4.0973E−02 |
| S5 | 1.0373E+00 | −6.6752E−01 | 2.3915E−01 | −3.6194E−02 |
| S6 | −4.4787E−02 | 2.7048E−02 | −7.8505E−03 | 1.0912E−03 |
| S7 | 3.2979E−01 | −2.3688E−01 | 9.2533E−02 | −1.4909E−02 |
| S8 | 8.4217E−02 | −3.0950E−02 | 6.5869E−03 | −6.0115E−04 |
| S9 | −3.5578E−03 | −1.2478E−03 | 4.7042E−04 | −4.3966E−05 |
| S10 | −3.6201E−02 | 5.9719E−03 | −5.4360E−04 | 2.0913E−05 |
| S11 | −4.9221E−03 | 8.2920E−04 | −7.8131E−05 | 3.0815E−06 |
| S12 | 6.7962E−04 | −1.0651E−04 | 8.1823E−06 | −2.5033E−07 |
| S13 | 1.9438E−04 | −1.5666E−05 | 6.8974E−07 | −1.2797E−08 |
| S14 | 4.0019E−04 | −3.2020E−05 | 1.4196E−06 | −2.6631E−08 |

Figure 8A:
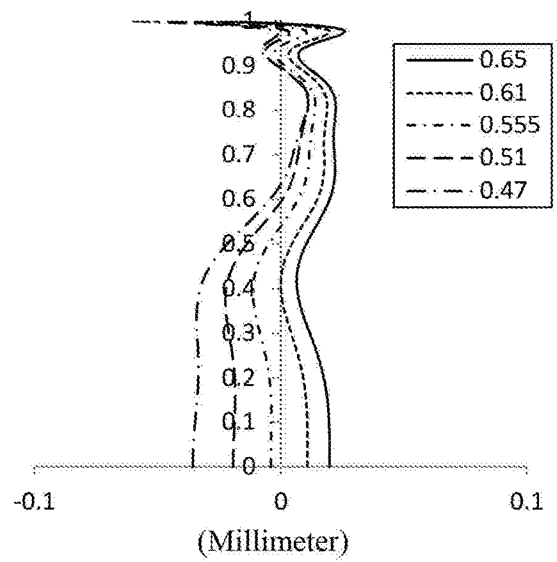
FIGS. 8A to 8D illustrate a longitudinal aberration curve, an astigmatic curve, a distortion curve, and a lateral color curve of the optical imaging lens assembly of the example 4, respectively.
Figure 8B:
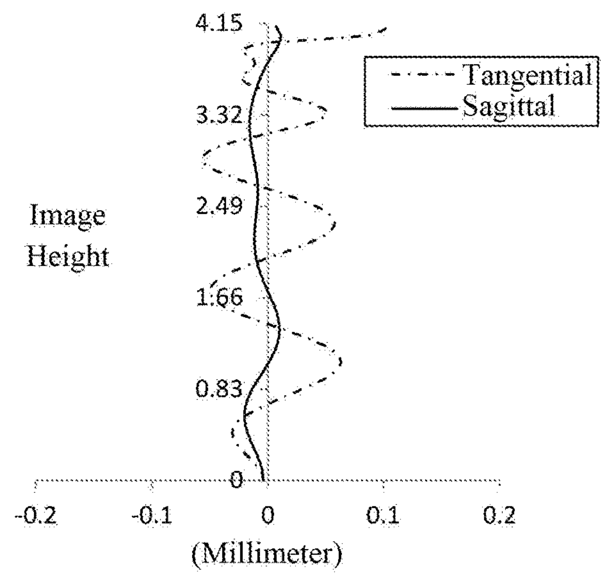
Figure 8C:
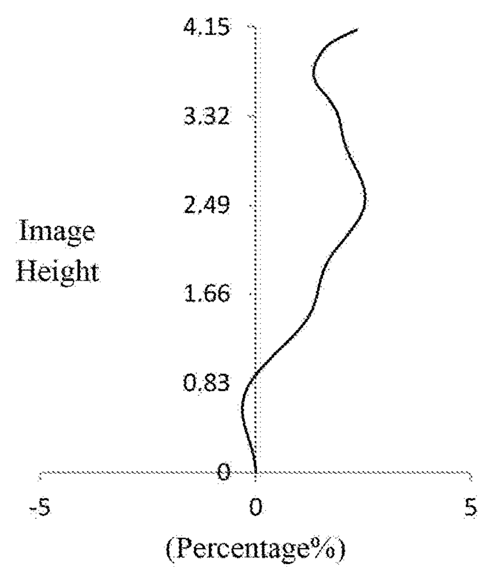
Figure 8D:
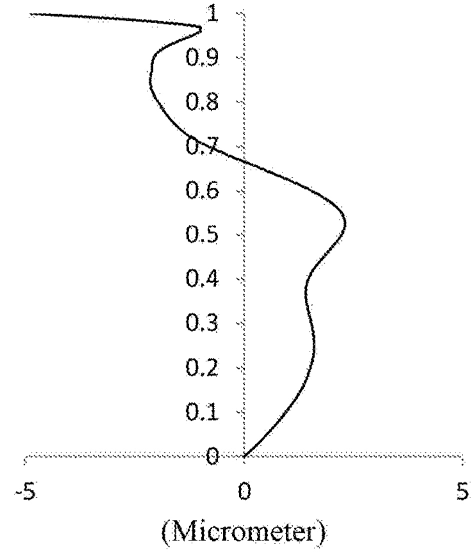

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16.

Light from an object sequentially passes through the respective surfaces S1 to S16 and is finally imaged on the imaging plane S17.

In this example, a total effective focal length f of the optical imaging lens assembly satisfies f=4.31 mm, a distance TTL along the optical axis from the object-side surface S1 of the first lens E1 to the imaging plane S17 satisfies TTL=5.33 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=43.0°, and an aperture value Fno of the optical imaging lens assembly satisfies Fno=1.49.

Table 9 is a table illustrating basic parameters of the optical imaging lens assembly of example 5, wherein the units for the radius of curvature, the thickness/distance and the focal length are millimeter (mm).

TABLE 9

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6200 | | | | |
| S1 | Aspheric | 1.9392 | 0.8055 | 1.56 | 58.4 | 4.46 | 0.2389 |
| S2 | Aspheric | 7.2545 | 0.0307 | | | | −1.0000 |
| S3 | Aspheric | 11.9132 | 0.2300 | 1.67 | 20.4 | −8.41 | −0.6334 |
| S4 | Aspheric | 3.7811 | 0.1263 | | | | 1.2479 |
| S5 | Aspheric | 3.3063 | 0.2483 | 1.62 | 23.5 | 25.01 | 2.9585 |
| S6 | Aspheric | 4.0369 | 0.2946 | | | | 6.6288 |
| S7 | Aspheric | −42.3047 | 0.5659 | 1.55 | 56.1 | 13.32 | 14.6450 |
| S8 | Aspheric | −6.2328 | 0.5126 | | | | 1.7397 |
| S9 | Aspheric | 3.6316 | 0.2606 | 1.67 | 20.4 | 200.33 | −0.1619 |
| S10 | Aspheric | 3.6261 | 0.2480 | | | | −27.3990 |
| S11 | Aspheric | 21.1129 | 0.4788 | 1.55 | 56.1 | 5.87 | 12.0656 |
| S12 | Aspheric | −3.7495 | 0.6946 | | | | −0.0800 |
| S13 | Aspheric | −3.5155 | 0.2300 | 1.54 | 55.9 | −2.68 | −0.1537 |
| S14 | Aspheric | 2.4938 | 0.1607 | | | | −0.5308 |
| S15 | Spherical | Infinite | 0.2100 | 1.52 | 64.2 | | |
| S16 | Spherical | Infinite | 0.2335 | | | | |
| S17 | Spherical | Infinite | | | | | |

In example 5, the object-side surface and the image-side surface of any one of the first lens E1 to the seventh lens E7 are aspheric. Table 10 below shows high-order coefficients A4, A6, A8, A10, A12, A14, A16, A18 and A20 applicable to each aspheric surface S1 to S14 in example 5.

TABLE 10

| Surface number | A4 | A6 | A8 | A10 | A12 |
|---|---|---|---|---|---|
| S1 | −6.3722E−03 | 7.7516E−03 | −2.0364E−02 | 2.0252E−02 | −8.5374E−03 |
| S2 | 1.6394E−02 | −1.7753E−02 | −3.0780E−01 | 7.9258E−01 | −9.3225E−01 |
| S3 | 4.2258E−02 | −5.0910E−02 | −1.7427E−01 | 5.3018E−01 | −6.1601E−01 |
| S4 | 1.5058E−03 | 6.3422E−02 | −3.1019E−01 | 9.0646E−01 | −1.5741E+00 |
| S5 | −7.8889E−02 | 2.6276E−02 | −2.4037E−02 | −2.9175E−02 | 7.9807E−02 |
| S6 | −5.2907E−02 | 2.4247E−03 | −2.3852E−03 | 2.1254E−02 | −1.2339E−01 |
| S7 | −3.9578E−02 | 1.8181E−02 | −1.4226E−01 | 3.6839E−01 | −6.2524E−01 |
| S8 | −4.2576E−02 | −9.7859E−03 | 5.0281E−04 | 8.3556E−03 | −2.4112E−02 |
| S9 | 1.1788E−02 | −1.9624E−01 | 2.6868E−01 | −1.9719E−01 | 7.9451E−02 |
| S10 | 1.7021E−01 | 4.0677E−01 | 4.3940E−01 | −2.8299E−01 | 1.1277E−01 |
| S11 | 1.6664E−01 | −2.3287E−01 | 1.4661E−01 | −5.7529E−02 | 1.5470E−02 |
| S12 | 1.3607E−01 | −8.2723E−02 | 7.7553E−03 | 1.5183E−02 | −8.4768E−03 |
| S13 | −8.7667E−02 | 4.2661E−02 | −1.3622E−02 | 4.3210E−03 | −1.0029E−03 |
| S14 | −1.8032E−01 | 1.0490E−01 | −4.6247E−02 | 1.4002E−02 | −2.8340E−03 |

| Surface number | A14 | A16 | A18 | A20 |
|---|---|---|---|---|
| S1 | −2.6870E−03 | 4.2714E−03 | −1.6906E−03 | 2.2634E−04 |
| S2 | 6.2942E−01 | −2.5280E−01 | 5.6564E−02 | −5.4604E−03 |
| S3 | 3.8762E−01 | −1.3881E−01 | 2.6668E−02 | −2.1411E−03 |

TABLE 10-continued

| | | | | |
|---|---|---|---|---|
| S4 | 1.6808E+00 | −1.0880E+00 | 3.8985E−01 | −5.8678E−02 |
| S5 | −5.2903E−02 | −8.9630E−03 | 2.4083E−02 | −6.8950E−03 |
| S6 | 2.5765E−01 | −2.5566E−01 | 1.2644E−01 | −2.4602E−02 |
| S7 | 6.6068E−01 | −4.2494E−01 | 1.5107E−01 | −2.2591E−02 |
| S8 | 2.4983E−02 | −1.3514E−02 | 3.7870E−03 | −4.4057E−04 |
| S9 | −1.6082E−02 | 7.5597E−04 | 2.4670E−04 | −3.0169E−05 |
| S10 | −2.7946E−02 | 4.1765E−03 | −3.4336E−04 | 1.1889E−05 |
| S11 | −3.0979E−03 | 4.5108E−04 | −4.0298E−05 | 1.5675E−06 |
| S12 | 2.0904E−03 | −2.7536E−04 | 1.8858E−05 | −5.2911E−07 |
| S13 | 1.4364E−04 | −1.2039E−05 | 5.4431E−07 | −1.0289E−08 |
| S14 | 3.7045E−04 | −2.9743E−05 | 1.3268E−06 | −2.5099E−08 |

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=4.06 mm, a distance TTL along the optical axis from the object-side surface S1 of the first lens E1 to the imaging plane S17 satisfies TTL=5.33 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=44.5°, and an aperture value Fno of the optical imaging lens assembly satisfies Fno=1.49.

Table 11 is a table illustrating basic parameters of the optical imaging lens assembly of example 6, wherein the units for the radius of curvature, the thickness/distance and the focal length are millimeter (mm).

TABLE 11

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6200 | | | | |
| S1 | Aspheric | 1.9734 | 0.7210 | 1.56 | 58.4 | 5.35 | 0.1340 |
| S2 | Aspheric | 4.9739 | 0.2093 | | | | −1.0000 |
| S3 | Aspheric | −10.0707 | 0.2300 | 1.67 | 20.4 | −24.76 | −1.0000 |
| S4 | Aspheric | −26.0767 | 0.0478 | | | | −99.0000 |
| S5 | Aspheric | 6.1788 | 0.2300 | 1.62 | 23.5 | −87.29 | −99.0000 |
| S6 | Aspheric | 5.4862 | 0.2085 | | | | 8.1026 |
| S7 | Aspheric | 42.3446 | 0.6297 | 1.55 | 56.1 | 8.57 | 15.2882 |
| S8 | Aspheric | −5.2326 | 0.5936 | | | | 2.1893 |
| S9 | Aspheric | 3.2188 | 0.3367 | 1.67 | 20.4 | −25.97 | −1.0000 |
| S10 | Aspheric | 2.6005 | 0.1794 | | | | −25.8621 |
| S11 | Aspheric | 7.2179 | 0.4396 | 1.55 | 56.1 | 4.93 | 2.2049 |
| S12 | Aspheric | −4.2050 | 0.6516 | | | | −0.7621 |
| S13 | Aspheric | −3.5639 | 0.2300 | 1.54 | 55.9 | −2.86 | −0.2705 |

TABLE 11-continued

| Surface number | Surface type | Radius of curvature | Thickness/ Distance | Material: Refractive index | Material: Abbe number | Focal length | Conic coefficient |
|---|---|---|---|---|---|---|---|
| S14 | Aspheric | 2.7501 | 0.1700 | | | | −0.4581 |
| S15 | Spherical | Infinite | 0.2100 | 1.52 | 64.2 | | |
| S16 | Spherical | Infinite | 0.2427 | | | | |
| S17 | Spherical | Infinite | | | | | |

In example 6, the object-side surface and the image-side surface of any one of the first lens E1 to the seventh lens E7 are aspheric. Table 12 below shows high-order coefficients A4, A6, A8, A10, A12, A14, A16, A18 and A20 applicable to each aspheric surface S1 to S14 in example 6.

TABLE 12

| Surface number | A4 | A6 | A8 | A10 | A12 |
|---|---|---|---|---|---|
| S1 | −6.0705E−03 | 1.2016E−02 | −2.5007E−02 | 1.5089E−02 | 1.7058E−02 |
| S2 | −1.1771E−02 | −2.0758E−02 | 2.4986E−03 | 4.8217E−02 | −1.2348E−01 |
| S3 | 3.8224E−03 | 9.9911E−03 | −1.6545E−01 | 4.9905E−01 | −7.4241E−01 |
| S4 | 9.8079E−03 | 6.8886E−02 | −5.5713E−01 | 1.6516E+00 | −2.7161E+00 |
| S5 | −2.5488E−02 | 8.4228E−02 | −5.8049E−01 | 1.4275E+00 | −2.0421E+00 |
| S6 | −7.4299E−02 | 3.8241E−02 | 5.0211E−02 | −4.1008E−01 | 9.2571E−01 |
| S7 | −6.6458E−02 | 7.5926E−02 | −2.7701E−01 | 6.0940E−01 | −8.9971E−01 |
| S8 | −5.4147E−02 | −1.7878E−02 | 8.2942E−02 | −1.8585E−01 | 2.2744E−01 |
| S9 | −8.8607E−02 | 5.6103E−02 | −8.6538E−02 | 9.2785E−02 | −5.9788E−02 |
| S10 | 7.5889E−02 | −1.2945E−01 | 8.0473E−02 | −2.5395E−02 | 2.2139E−03 |
| S11 | −1.3312E−03 | 4.4722E−02 | −7.1683E−02 | 4.6147E−02 | −1.7025E−02 |
| S12 | 6.2451E−02 | 6.0076E−04 | −1.1865E−02 | 5.4146E−03 | −1.6370E−03 |
| S13 | −8.4223E−02 | 3.0612E−02 | −4.2507E−03 | 7.1606E−04 | −1.9750E−04 |
| S14 | −1.1711E−01 | 4.4947E−02 | −1.3450E−02 | 2.8842E−03 | −4.4686E−04 |

| Surface number | A14 | A16 | A18 | A20 |
|---|---|---|---|---|
| S1 | −3.7576E−02 | 2.7501E−02 | −9.3864E−03 | 1.2335E−03 |
| S2 | 1.5162E−01 | −1.0036E−01 | 3.4137E−02 | −4.6753E−03 |
| S3 | 6.6170E−01 | −3.5991E−01 | 1.0989E−01 | −1.4310E−02 |
| S4 | 2.7378E+00 | −1.6865E+00 | 5.8020E−01 | −8.4614E−02 |
| S5 | 1.8344E+00 | −1.0244E+00 | 3.2768E−01 | −4.5693E−02 |
| S6 | −1.0828E+00 | 7.1771E−01 | −2.5405E−01 | 3.7416E−02 |
| S7 | 8.4250E−01 | −4.8078E−01 | 1.5081E−01 | −1.9918E−02 |
| S8 | −1.6959E−01 | 7.5320E−02 | −1.8245E−02 | 1.8146E−03 |
| S9 | 2.3024E−02 | −5.2384E−03 | 6.4994E−04 | −3.3833E−05 |
| S10 | 1.0962E−03 | −3.9417E−04 | 5.1681E−05 | −2.5036E−06 |
| S11 | 3.7014E−03 | −4.5874E−04 | 2.9558E−05 | −7.5418E−07 |
| S12 | 3.5567E−04 | −4.8322E−05 | 3.5463E−06 | −1.0664E−07 |
| S13 | 3.5759E−05 | −3.5240E−06 | 1.7938E−07 | −3.7375E−09 |
| S14 | 4.8238E−05 | −3.3602E−06 | 1.3365E−07 | −2.2912E−09 |

Figure 12A:
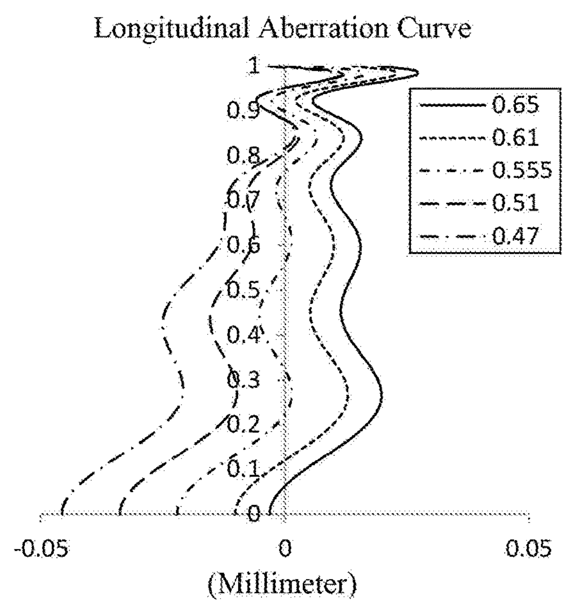
FIGS. 12A to 12D illustrate a longitudinal aberration curve, an astigmatic curve, a distortion curve, and a lateral color curve of the optical imaging lens assembly of the example 6, respectively.
Figure 12B:
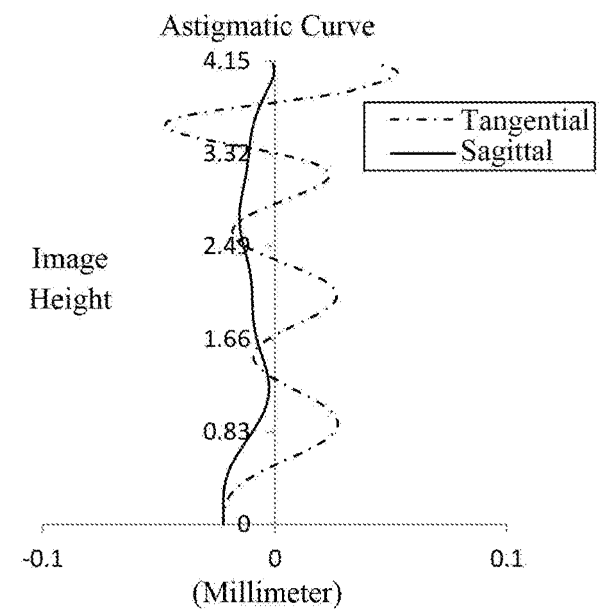
Figure 12C:
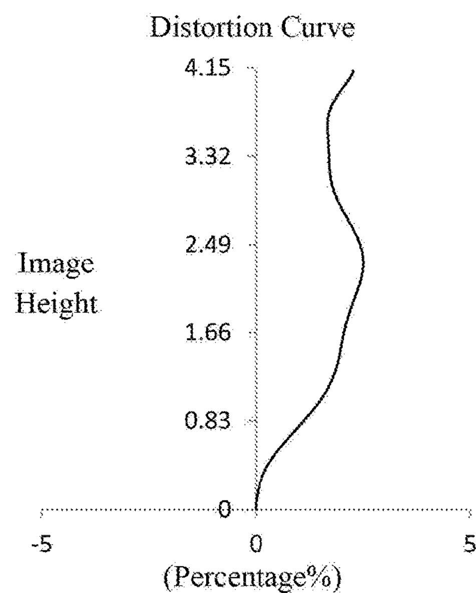
Figure 12D:
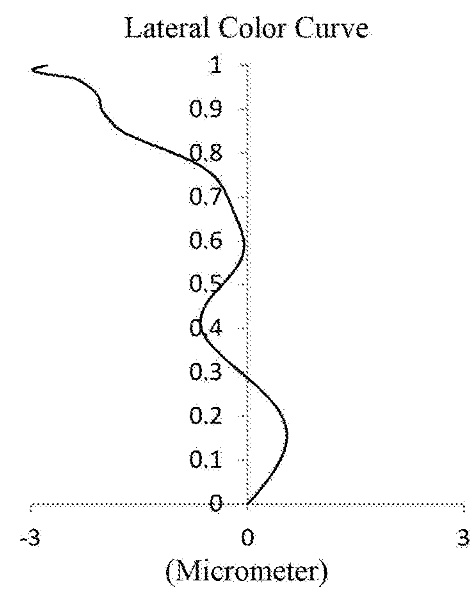

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=4.11 mm, a distance TTL along the optical axis from the object-side surface S1 of the first lens E1 to the imaging plane S17 satisfies TTL=5.33 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=43.8°, and an aperture value Fno of the optical imaging lens assembly satisfies Fno=1.46.

Table 13 is a table illustrating basic parameters of the optical imaging lens assembly of example 7, wherein the units for the radius of curvature, the thickness/distance and the focal length are millimeter (mm).

TABLE 13

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.5500 | | | | |
| S1 | Aspheric | 1.9441 | 0.7694 | 1.56 | 58.4 | 5.11 | 0.2195 |
| S2 | Aspheric | 5.1423 | 0.1060 | | | | −1.0000 |
| S3 | Aspheric | 12.9490 | 0.2300 | 1.67 | 20.4 | −29.48 | −30.6045 |
| S4 | Aspheric | 7.7499 | 0.2068 | | | | 10.1557 |
| S5 | Aspheric | −200.0000 | 0.2500 | 1.62 | 23.5 | −41.31 | −99.0000 |
| S6 | Aspheric | 30.7320 | 0.1449 | | | | 99.0000 |
| S7 | Aspheric | 43.0391 | 0.5923 | 1.55 | 56.1 | 10.38 | 13.6153 |
| S8 | Aspheric | −6.4932 | 0.5375 | | | | 2.1302 |
| S9 | Aspheric | 2.9562 | 0.2571 | 1.67 | 20.4 | −38.69 | −1.0000 |
| S10 | Aspheric | 2.5599 | 0.2036 | | | | −40.2588 |
| S11 | Aspheric | 7.0963 | 0.4577 | 1.55 | 56.1 | 4.93 | 1.2309 |
| S12 | Aspheric | −4.2387 | 0.7338 | | | | −0.1506 |
| S13 | Aspheric | −3.5195 | 0.2300 | 1.54 | 55.9 | −2.71 | −0.2007 |
| S14 | Aspheric | 2.5344 | 0.1641 | | | | −0.5106 |
| S15 | Spherical | Infinite | 0.2100 | 1.52 | 64.2 | | |
| S16 | Spherical | Infinite | 0.2368 | | | | |
| S17 | Spherical | Infinite | | | | | |

In example 7, the object-side surface and the image-side surface of any one of the first lens E1 to the seventh lens E7 are aspheric. Table 14 below shows high-order coefficients A4, A6, A8, A10, A12, A14, A16, A18 and A20 applicable to each aspheric surface S1 to S14 in example 7.

TABLE 14

| Surface number | A4 | A6 | A8 | A10 | A12 |
|---|---|---|---|---|---|
| S1 | −6.2996E−03 | 8.3927E−03 | −2.9114E−03 | −3.7868E−02 | 8.5215E−02 |
| S2 | −2.1517E−02 | −5.5035E−02 | 1.5594E−01 | −3.0026E−01 | 3.8662E−01 |
| S3 | −2.9295E−02 | −2.5832E−02 | 9.5588E−02 | −1.4429E−01 | 1.9124E−01 |
| S4 | −1.6437E−03 | −2.9154E−02 | 7.7665E−02 | −1.2026E−03 | −2.1396E−01 |
| S5 | −3.4924E−02 | 1.2800E−02 | −1.7201E−01 | 4.8708E−01 | −7.6490E−01 |
| S6 | −2.7165E−02 | −6.7108E−02 | 2.1465E−01 | −5.0166E−01 | 7.7466E−01 |
| S7 | −4.9034E−02 | 1.5525E−02 | −1.7440E−01 | 4.6280E−01 | −7.6741E−01 |
| S8 | 9.4216E−03 | −3.8279E−01 | 1.2570E+00 | −2.4088E+00 | 2.7940E+00 |
| S9 | −5.8271E−02 | −5.3755E−02 | 1.0076E−01 | −7.7002E−02 | 2.8767E−02 |
| S10 | 2.2665E−01 | −4.8902E−01 | 5.0884E−01 | −3.1718E−01 | 1.2227E−01 |
| S11 | 1.0629E−01 | −1.7038E−01 | 1.2492E−01 | −6.0544E−02 | 2.0257E−02 |
| S12 | 1.1302E−01 | −6.4701E−02 | 1.5746E−02 | 3.2332E−03 | −3.4676E−03 |
| S13 | −1.0801E−01 | 6.6580E−02 | −3.0133E−02 | 1.1443E−02 | −2.9066E−03 |
| S14 | −1.6942E−01 | 9.6139E−02 | −4.1297E−02 | 1.2138E−02 | −2.3864E−03 |

| Surface number | A14 | A16 | A18 | A20 |
|---|---|---|---|---|
| S1 | −8.6699E−02 | 4.7102E−02 | −1.3263E−02 | 1.5060E−03 |
| S2 | −3.0583E−01 | 1.4068E−01 | −3.4258E−02 | 3.3680E−03 |
| S3 | −1.7759E−01 | 9.5905E−02 | −2.6513E−02 | 2.8806E−03 |

TABLE 14-continued

| | | | | |
|---|---|---|---|---|
| S4 | 3.7628E−01 | −3.1833E−01 | 1.3456E−01 | −2.2288E−02 |
| S5 | 7.4001E−01 | −4.3846E−01 | 1.4690E−01 | −2.1172E−02 |
| S6 | −7.2849E−01 | 4.0520E−01 | −1.1972E−01 | 1.4287E−02 |
| S7 | 7.9031E−01 | −4.9251E−01 | 1.6895E−01 | −2.4509E−02 |
| S8 | −2.0050E+00 | 8.6994E−01 | −2.0920E−01 | 2.1392E−02 |
| S9 | −4.5475E−03 | −1.8899E−04 | 1.5089E−04 | −1.3421E−05 |
| S10 | −2.9229E−02 | 4.1932E−03 | −3.2862E−04 | 1.0740E−05 |
| S11 | −4.7931E−03 | 7.5753E−04 | −6.9307E−05 | 2.7085E−06 |
| S12 | 1.0208E−03 | −1.4854E−04 | 1.0893E−05 | −3.2173E−07 |
| S13 | 4.5612E−04 | −4.2597E−05 | 2.1769E−06 | −4.6978E−08 |
| S14 | 3.0433E−04 | −2.3994E−05 | 1.0587E−06 | −1.9944E−08 |

Figure 14C:
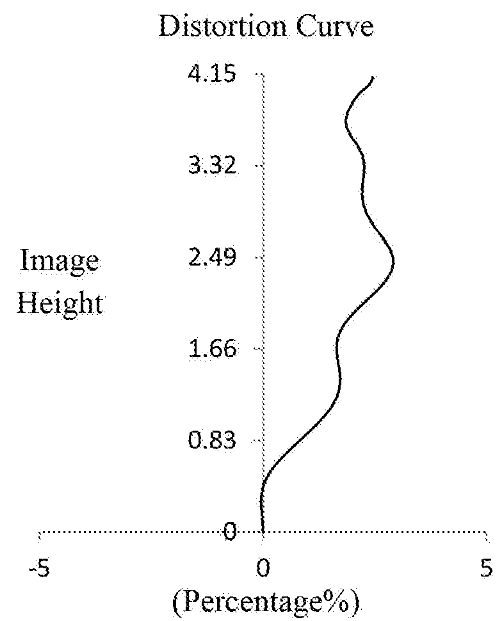
Figure 14D:
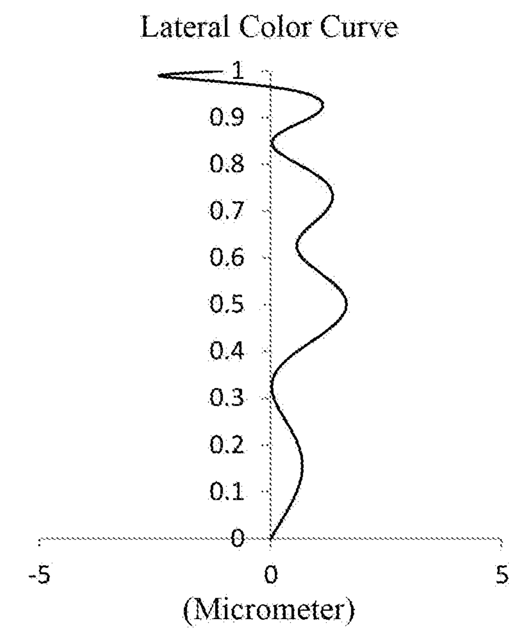

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

Example 8

Figure 15:
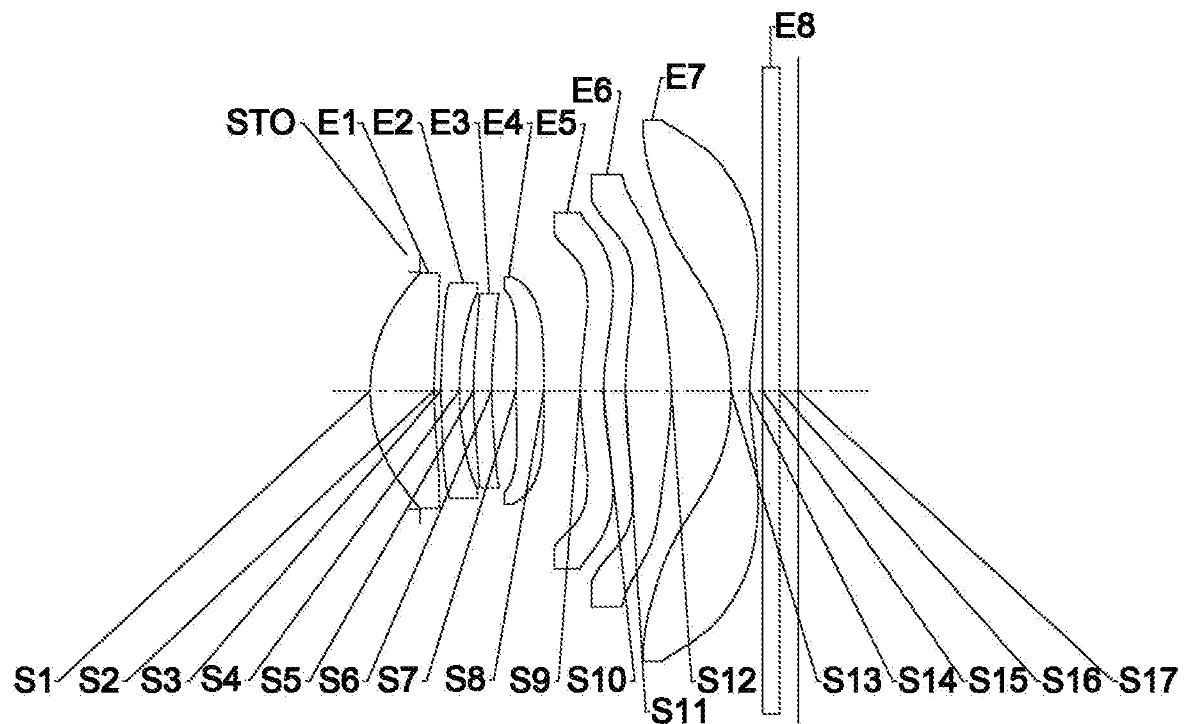
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=4.32 mm, a distance TTL along the optical axis from the object-side surface S1 of the first lens E1 to the imaging plane S17 satisfies TTL=5.33 mm, half of a diagonal length ImgH of an effective pixel area on the imaging plane S17 satisfies ImgH=4.12 mm, half of a maximal field-of-view Semi-FOV of the optical imaging lens assembly satisfies Semi-FOV=42.9°, and an aperture value Fno of the optical imaging lens assembly satisfies Fno=1.49.

Table 15 is a table illustrating basic parameters of the optical imaging lens assembly of example 8, wherein the units for the radius of curvature, the thickness/distance and the focal length are millimeter (mm).

TABLE 15

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.6200 | | | | |
| S1 | Aspheric | 1.9509 | 0.7950 | 1.56 | 58.4 | 4.94 | 0.2291 |
| S2 | Aspheric | 5.5880 | 0.0846 | | | | −1.0000 |
| S3 | Aspheric | 6.7986 | 0.2300 | 1.67 | 20.4 | −12.65 | −7.0582 |
| S4 | Aspheric | 3.7127 | 0.1764 | | | | 1.7182 |
| S5 | Aspheric | 5.0611 | 0.2300 | 1.62 | 23.5 | 46.92 | −4.1038 |
| S6 | Aspheric | 5.9700 | 0.3025 | | | | 12.1794 |
| S7 | Aspheric | 11.5643 | 0.3446 | 1.55 | 56.1 | 22.47 | 40.3719 |
| S8 | Aspheric | 200.0000 | 0.4504 | | | | −99.0000 |
| S9 | Aspheric | 3.0538 | 0.2891 | 1.67 | 20.4 | −70.28 | 1.2672 |
| S10 | Aspheric | 2.7583 | 0.2763 | | | | −27.9400 |
| S11 | Aspheric | 7.8094 | 0.5740 | 1.55 | 56.1 | 4.43 | −0.1457 |
| S12 | Aspheric | −3.4081 | 0.7394 | | | | −0.2552 |
| S13 | Aspheric | −3.5571 | 0.2300 | 1.54 | 55.9 | −2.73 | −0.1058 |

TABLE 15-continued

| Surface number | Surface type | Radius of curvature | Thickness/ Distance | Material: Refractive index | Material: Abbe number | Focal length | Conic coefficient |
|---|---|---|---|---|---|---|---|
| S14 | Aspheric | 2.5537 | 0.1625 | | | | −0.5336 |
| S15 | Spherical | Infinite | 0.2100 | 1.52 | 64.2 | | |
| S16 | Spherical | Infinite | 0.2353 | | | | |
| S17 | Spherical | Infinite | | | | | |

In example 8, the object-side surface and the image-side surface of any one of the first lens E1 to the seventh lens E7 are aspheric. Table 16 below shows high-order coefficients A4, A6, A8, A10, A12, A14, A16, A18 and A20 applicable to each aspheric surface S1 to S14 in example 8.

TABLE 16

| Surface number | A4 | A6 | A8 | A10 | A12 |
|---|---|---|---|---|---|
| S1 | −5.5152E−03 | 3.8866E−03 | −3.3495E−03 | −1.4666E−02 | 3.4566E−02 |
| S2 | −3.7418E−02 | 9.4237E−03 | −3.3186E−02 | 9.6589E−02 | −1.3733E−01 |
| S3 | −4.5908E−02 | −5.1187E−03 | 1.1023E−01 | −2.3444E−01 | 3.1370E−01 |
| S4 | −2.5481E−02 | 6.4477E−02 | −2.4491E−01 | 7.8423E−01 | −1.4817E+00 |
| S5 | −3.5130E−02 | 6.3274E−02 | −2.7713E−01 | 7.1518E−01 | −1.1970E+00 |
| S6 | −4.4573E−02 | 5.4604E−02 | −1.7918E−01 | 3.8816E−01 | −5.7839E−01 |
| S7 | −5.8390E−02 | 2.0481E−04 | 6.1928E−02 | −2.7692E−01 | 5.1579E−01 |
| S8 | −6.7436E−02 | 1.0987E−02 | 1.2107E−02 | −6.4087E−02 | 7.3715E−02 |
| S9 | −8.2507E−02 | 4.8836E−02 | 9.6686E−02 | −6.6245E−02 | 1.5436E−02 |
| S10 | 1.0987E−01 | −2.9674E−01 | 3.2489E−01 | −2.1011E−01 | 8.4155E−02 |
| S11 | 7.3180E−02 | −1.1570E−01 | 8.2344E−02 | −4.0327E−02 | 1.3807E−02 |
| S12 | 9.4507E−02 | 4.7215E−02 | 1.2867E−02 | −3.8266E−04 | −9.5835E−04 |
| S13 | −9.5965E−02 | 5.5027E−02 | −2.1871E−02 | 7.1661E−03 | −1.5716E−03 |
| S14 | −1.6995E−01 | 9.7783E−02 | −4.2726E−02 | 1.2777E−02 | −2.5575E−03 |

| Surface number | A14 | A16 | A18 | A20 |
|---|---|---|---|---|
| S1 | −3.5141E−02 | 1.8862E−02 | −5.2662E−03 | 5.9205E−04 |
| S2 | 1.1328E−01 | −5.5850E−02 | 1.5221E−02 | −1.7616E−03 |
| S3 | −2.6366E−01 | 1.3221E−01 | −3.5764E−02 | 3.9977E−03 |
| S4 | 1.6695E+00 | −1.1092E+00 | 3.9963E−01 | −5.9739E−02 |
| S5 | 1.2649E+00 | −8.1526E−01 | 2.9271E−01 | −4.4387E−02 |
| S6 | 5.7594E−01 | −3.6388E−01 | 1.3303E−01 | −2.1060E−02 |
| S7 | −5.6180E−01 | 3.6203E−01 | −1.2875E−01 | 1.9547E−02 |
| S8 | −4.5160E−02 | 1.4580E−02 | −2.0550E−03 | 2.3324E−05 |
| S9 | 3.8835E−03 | −3.1867E−03 | 7.1146E−04 | −5.5755E−05 |
| S10 | −2.1038E−02 | 3.1784E−03 | −2.6383E−04 | 9.1773E−06 |
| S11 | −3.3099E−03 | 5.1881E−04 | −4.6233E−05 | 1.7407E−06 |
| S12 | 2.9788E−04 | −4.0047E−05 | 2.5885E−06 | −6.5476E−08 |
| S13 | 2.1205E−04 | −1.6917E−05 | 7.3409E−07 | −1.3386E−08 |
| S14 | 3.3174E−04 | −2.6504E−05 | 1.1781E−06 | −2.2208E−08 |

Figure 16A:
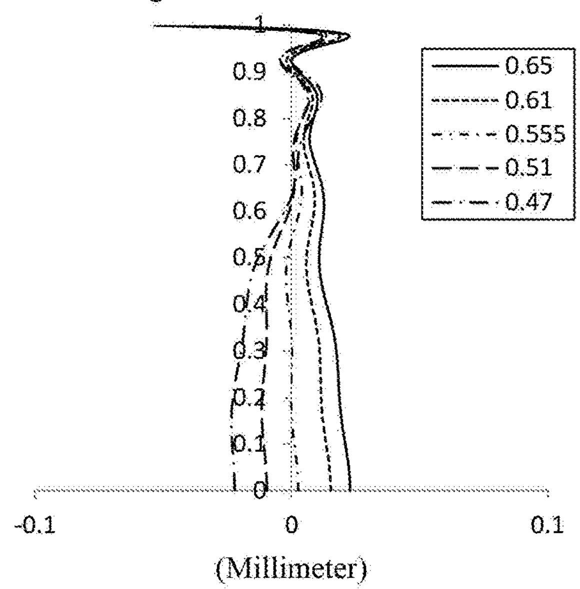
FIGS. 16A to 16D illustrate a longitudinal aberration curve, an astigmatic curve, a distortion curve, and a lateral color curve of the optical imaging lens assembly of the example 8, respectively.
Figure 16B:
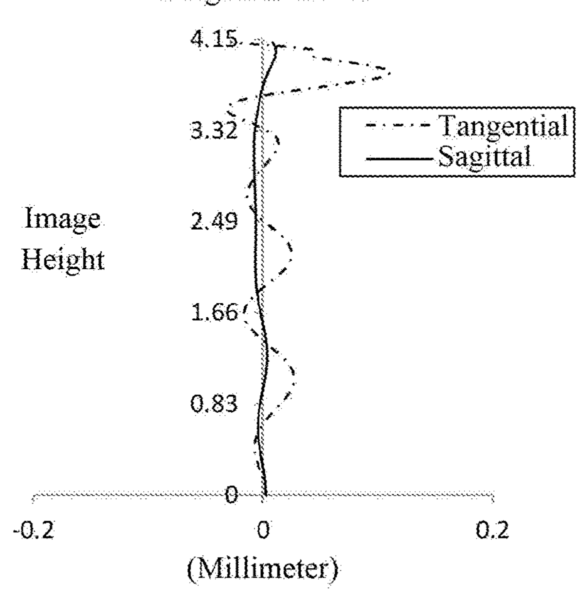
Figure 16C:
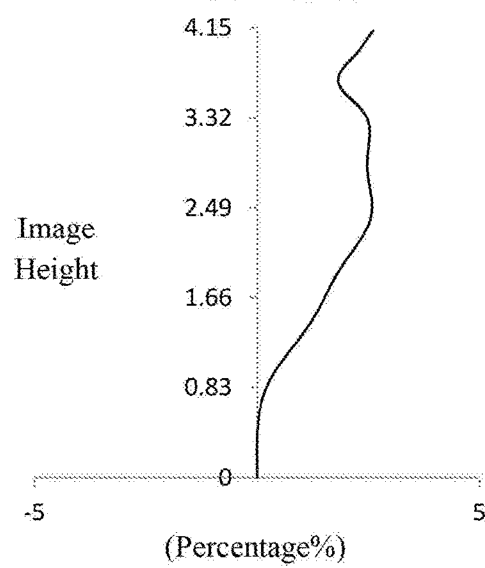
Figure 16D:
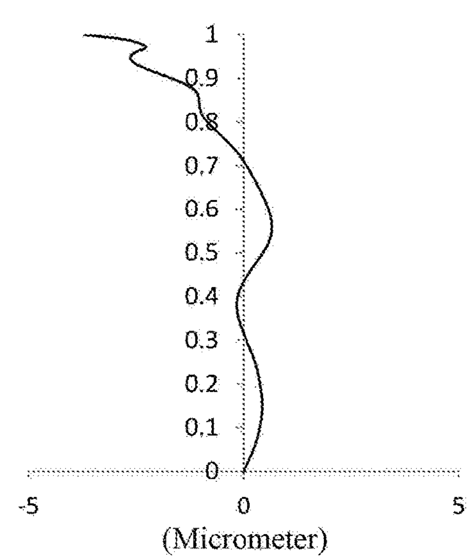

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. FIG. 16D illustrates a lateral color curve of the optical imaging lens assembly according to example 8, representing deviations of different image heights on an imaging plane after light passes through the lens assembly. It can be seen from FIG. 16A to FIG. 16D that the optical imaging lens assembly provided in example 8 may achieve good image quality.

In view of the above, examples 1 to 8 respectively satisfy the relationship shown in Table 17.

TABLE 17

| Conditional | Example 1 | 2 | 3 | 4 | 5 | 6 | 7 | 8 |
|---|---|---|---|---|---|---|---|---|
| TTL/ImgH | 1.26 | 1.29 | 1.29 | 1.29 | 1.29 | 1.29 | 1.29 | 1.29 |
| TTL/ImgH*f (mm) | 5.35 | 5.50 | 5.52 | 5.56 | 5.58 | 5.26 | 5.31 | 5.59 |

TABLE 17-continued

| Conditional | Example 1 | 2 | 3 | 4 | 5 | 6 | 7 | 8 |
|---|---|---|---|---|---|---|---|---|
| ImgH*f/tan²(Semi-FOV) (mm²) | 19.17 | 19.56 | 19.75 | 20.27 | 20.45 | 17.33 | 18.33 | 20.61 |
| f1/f6 | 0.97 | 1.35 | 1.06 | 1.00 | 0.76 | 1.08 | 1.04 | 1.12 |
| f56/BFL | 11.42 | 9.05 | 8.92 | 7.57 | 9.74 | 10.13 | 9.52 | 8.03 |
| R2/f | 1.20 | 0.82 | 1.17 | 1.36 | 1.68 | 1.22 | 1.25 | 1.29 |
| (R13 − R14)/(R13 + R14) | 5.65 | 5.18 | 5.09 | 6.30 | 5.88 | 7.76 | 6.14 | 6.09 |
| T67/T56 | 4.61 | 3.84 | 3.17 | 2.56 | 2.80 | 3.63 | 3.60 | 2.68 |
| (CT6 + CT7)/(CT6 − CT7) | 3.67 | 2.63 | 2.76 | 2.96 | 2.85 | 3.19 | 3.02 | 2.34 |
| SAG51/SAG52 | 1.23 | 0.72 | 1.11 | 1.18 | 1.21 | 1.11 | 1.20 | 1.08 |
| DT72/DT11 | 2.32 | 2.37 | 2.35 | 2.27 | 2.29 | 2.37 | 2.37 | 2.30 |
| ImgH (mm) | 4.12 | 4.12 | 4.12 | 4.12 | 4.12 | 4.12 | 4.12 | 4.12 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:

a first lens having positive refractive power with a convex object-side surface and a concave image-side surface;

a second lens having refractive power;

a third lens having refractive power with a concave image-side surface;

a fourth lens having positive refractive power;

a fifth lens having negative refractive power in the paraxial region, with a convex object-side surface and a concave image-side surface;

a sixth lens having positive refractive power with a convex object-side surface and a convex image-side surface; and a seventh lens having negative refractive power with a concave object-side surface and a concave image-side surface, wherein TTL/ImgH<1.30; and 5.00 mm<TTL/ImgH*f<6.00 mm, where TTL is a distance along the optical axis from the object-side surface of the first lens to an imaging plane of the optical imaging lens assembly, ImgH is half of a diagonal length of an effective pixel area on the imaging plane of the optical imaging lens assembly, and f is a total effective focal length of the optical imaging lens assembly, wherein the optical imaging lens assembly further satisfies:

$$5.00<(R13-R14)/(R13+R14)<8.00, \text{ or}$$

$$2.00<T67/T56<5.00, \text{ or}$$

$$2.00<(CT6+CT7)/(CT6-CT7)<4.00,$$

where R13 is a radius of curvature of the object-side surface of the seventh lens, R14 is a radius of curvature of the image-side surface of the seventh lens, T67 is a spaced interval between the sixth lens and the seventh lens along the optical axis, T56 is a spaced interval between the fifth lens and the sixth lens along the optical axis, CT6 is a center thickness of the sixth lens along the optical axis, and CT7 is a center thickness of the seventh lens along the optical axis.

2. The optical imaging lens assembly according to claim 1, wherein 1.20<TTL/ImgH<1.30.

3. The optical imaging lens assembly according to claim 1, wherein 0.50<f1/f6<1.50, where f1 is an effective focal length of the first lens, and f6 is an effective focal length of the sixth lens.

4. The optical imaging lens assembly according to claim 1, wherein 7.00<f56/BFL<12.00, where f56 is a combined focal length of the fifth lens and the sixth lens, and BFL is a distance along the optical axis from an image-side surface of a lens closest to the imaging plane to the imaging plane.

5. The optical imaging lens assembly according to claim 1, wherein 0.50<R2/f<2.00, where R2 is a radius of curvature of the image-side surface of the first lens, and f is the total effective focal length of the optical imaging lens assembly.

6. The optical imaging lens assembly according to claim 1, wherein 0.50<SAG51/SAG52<1.50, where SAG51 is an on-axis distance from an intersection of the object-side surface of the fifth lens and the optical axis to a vertex of an effective radius of the object-side surface of the fifth lens, and SAG52 is an on-axis distance from an intersection of the image-side surface of the fifth lens and the optical axis to a vertex of an effective radius of the image-side surface of the fifth lens.

7. The optical imaging lens assembly according to claim 1, wherein 2.00<DT72/DT11<3.00, where DT72 is a maximum effective radius of the image-side surface of the seventh lens, and DT11 is a maximum effective radius of the object-side surface of the first lens.

8. The optical imaging lens assembly according to claim 1, wherein ImgH>4.10 mm, where ImgH is half of the diagonal length of the effective pixel area on the imaging plane of the optical imaging lens assembly.

9. The optical imaging lens assembly according to claim 1, further comprising a stop disposed at the object-side surface of the first lens.

10. The optical imaging lens assembly according to claim 1, wherein 17.00 $mm^2$<ImgH*f/$tan^2$(Semi-FOV)<21.00 $mm^2$, where Semi-FOV is half of a maximal field-of-view of the optical imaging lens assembly.

11. The optical imaging lens assembly according to claim 10, wherein 0.50<f1/f6<1.50, where f1 is an effective focal length of the first lens, and f6 is an effective focal length of the sixth lens.

12. The optical imaging lens assembly according to claim 10, wherein 7.00<f56/BFL<12.00, where f56 is a combined focal length of the fifth lens and the sixth lens, and BFL is a distance along the optical axis from an image-side surface of a lens closest to the imaging plane to the imaging plane.

13. The optical imaging lens assembly according to claim 10, wherein 0.50<R2/f<2.00, where R2 is a radius of curvature of the image-side surface of the first lens, and f is the total effective focal length of the optical imaging lens assembly.

14. The optical imaging lens assembly according to claim 1, wherein 5.00 mm<TTL/ImgH*f<5.59 mm.

* * * * *